United States Patent
Ono et al.

(10) Patent No.: US 8,040,392 B2
(45) Date of Patent: Oct. 18, 2011

(54) FLICKER CORRECTING METHOD, FLICKER CORRECTING CIRCUIT, AND IMAGING DEVICE USING THEM

(75) Inventors: Noriyuki Ono, Kanagawa (JP);
Motohiro Nakasuzi, Kanagawa (JP);
Yoshiaki Nishide, Kanagawa (JP);
Hiromasa Ikeyama, Tokyo (JP);
Fumihiko Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 11/719,104

(22) PCT Filed: Nov. 11, 2005

(86) PCT No.: PCT/JP2005/020741
§ 371 (c)(1),
(2), (4) Date: Feb. 5, 2008

(87) PCT Pub. No.: WO2006/051914
PCT Pub. Date: May 18, 2006

(65) Prior Publication Data
US 2009/0051782 A1    Feb. 26, 2009

(30) Foreign Application Priority Data

Nov. 15, 2004   (JP) .................................. P2004-330299

(51) Int. Cl.
*H04N 9/73*  (2006.01)
*H04N 5/222* (2006.01)
(52) U.S. Cl. .................................... 348/226.1; 348/370
(58) Field of Classification Search ............... 348/226.1, 348/370
See application file for complete search history.

(56) References Cited

U.S. PATENT DOCUMENTS

| | | | |
|---|---|---|---|
| 6,661,453 B1 | 12/2003 | Numazaki et al. | |
| 7,471,315 B2 * | 12/2008 | Silsby et al. | 348/226.1 |
| 7,589,763 B2 * | 9/2009 | Ono et al. | 348/226.1 |
| 7,764,312 B2 * | 7/2010 | Ono et al. | 348/226.1 |
| 2004/0012692 A1* | 1/2004 | Arazaki | 348/226.1 |
| 2004/0165084 A1* | 8/2004 | Yamamoto et al. | 348/226.1 |
| 2004/0179114 A1 | 9/2004 | Silsby et al. | |
| 2005/0046704 A1* | 3/2005 | Kinoshita | 348/226.1 |
| 2006/0054783 A1* | 3/2006 | Voronov et al. | 250/208.1 |
| 2007/0182831 A1* | 8/2007 | Katoh et al. | 348/226.1 |

FOREIGN PATENT DOCUMENTS

| | | |
|---|---|---|
| EP | 1 324 598 A2 | 7/2003 |
| EP | 1 324 598 A3 | 7/2003 |
| EP | 1 566 962 A1 | 8/2005 |
| JP | 4 70278 | 3/1992 |
| JP | 8 256294 | 10/1996 |
| JP | 2000 4382 | 1/2000 |
| JP | 2003 198932 | 7/2003 |
| JP | 2003 333423 | 11/2003 |
| WO | WO 2004/047427 A1 | 6/2004 |

* cited by examiner

*Primary Examiner* — Hung Lam
(74) *Attorney, Agent, or Firm* — Oblon, Spivak, McClelland, Maier & Neustadt, L.L.P.

(57) ABSTRACT

An arithmetic processing section executes an arithmetic process on a flicker correction signal output from a flicker correction signal outputting section and corresponding to the flicker component contained in a video signal of each of specific periods and the video signal of each of the specific periods to form a corrected video signal of the specific period corrected for the flicker component of the specific period for the video signal of each of the specific periods formed as a succession of specific periods and containing a flicker component as supplied from a video signal generating section in response to a correction error signal of each of the specific periods supplied from a correction error detecting section.

15 Claims, 14 Drawing Sheets

PRIOR ART

FLICKER CORRECTING METHOD, FLICKER CORRECTING CIRCUIT, AND IMAGING DEVICE USING THEM

TECHNICAL FIELD

This invention relates to a flicker correction method and a flicker correction circuit for correcting a video signal containing a flicker component to reduce the flicker component and also to an image pickup apparatus employing such a flicker correction method and such a flicker correction circuit.

This application is based upon and claims the benefit of priority from the prior Japanese Patent Application No. 2004-330299, filed on Nov. 15, 2004, the entire contents of which are incorporated herein by reference.

BACKGROUND ART

Image pickup apparatus (video cameras) comprising an imaging signal generating section adapted to generate imaging output signals corresponding to the image of a subject obtained by way of an optical system that contains a solid-state imaging element and acquire video signals representing the image of the subject according to the imaging output signals have been and being popularly marketed. The solid-state imaging element contained in the imaging signal generating section arranged in such an image pickup apparatus includes light receiving parts, each of which performs an operation of photoelectric conversion upon receiving light from the subject by way of the optical system and accumulates the signal charges obtained as a result of the operation, a charge sending out section for sending out the signal charges accumulated in the light receiving part and an output part for generating imaging output signals according to the signal charge sent out from the charge sending out section.

The charge sending out section of a solid-state imaging element may be formed by using a charge coupled device (CCD) adapted to sequentially transfer the signal charges accumulated in the light receiving parts and read out from the light receiving parts, a complementary metal oxide semiconductor (CMOS) adapted to send out the signal charges accumulated in the light receiving parts according to a switching operation or some other device. An image pickup apparatus comprising a solid-state imaging element having a charge sending out section formed by using a CCD, or a so-called CCD image sensor, is normally referred to as CCD camera, whereas an image pickup apparatus comprising a solid-state imaging element having a charge sending out section formed by using a CMOS, or so-called CMOS image sensor, is normally referred to as CMOS camera.

Meanwhile, when an image is picked up by an image pickup apparatus under a light source that periodically flickers such as a fluorescent lamp, the picked up image shows periodical light and dark stripes to consequently give rise to a phenomenon of flowing light and dark stripes in the image. Otherwise, the entire image becomes periodically light and dark from frame to frame. This is a phenomenon called flicker, which constitutes an inevitable problem when an image is picked up by an image pickup apparatus comprising an image sensor adapted to pick up an image with shifted timings of accumulating electric charges under a flickering light source.

Conventionally, an image sensor shifts timings of accumulating electric charges on a frame by frame basis or on a line by line basis. Generally, a system of matching the timing of electric charge accumulation on a frame by frame basis is referred to as global shutter system, whereas a system of matching the timing of electric charge accumulation on a line by line basis is referred to as rolling shutter system. While CCD image sensors provided with a global shutter system have been in the main stream, CMOS image sensors are attracting attention because they consume less electric power and can be manufactured with a reduced number of parts at low cost. CMOS image sensors are more often than not provided with a rolling shutter system from the structural viewpoint. With either of the systems, flicker appears due to the difference of timing of electric charge accumulation when an image is picked up under a light source that flickers, although the mode of flicker may differ between a frame flicker where an entire frame become light or dark from frame to frame and a line flicker where an image flickers on a line by line basis.

FIG. 1 illustrates how the amount of the electric charge accumulated in a sensor changes when the global shutter system is employed and FIG. 2 illustrates an image that flickers from frame to frame when the global shutter system is employed, while FIG. 3 illustrates how the amount of the electric charge accumulated in a sensor changes when the rolling shutter system is employed and FIG. 4 illustrates an image that flickers on line by line basis.

For instance, when picking up an image by means of a CMOS camera and the light source that illuminates the subject flickers with a period that corresponds to the period of the AC power supply, e.g. a period equal to ½ of the period of the AC power supply, such as a fluorescent lamp, the video signals formed on the basis of the imaging output signals from the solid-state imaging element can contain a flicker component that appears as periodic rises and falls of the luminance level. Such a flicker component contained in video signals is produced as the amount of the electric charges accumulated in the light receiving parts of the solid-state imaging element, which accumulate signal charges for a predetermined period and sends out the accumulated signal charges in each predetermined period, periodically changes under the influence of the periodic fluctuations of the luminance of the light source illuminating the subject.

When the luminance of the light source illuminating a subject periodically fluctuates as indicated by X in FIG. 3 while a signal charge is accumulated in light receiving part Ln, which is a row of light receiving elements for accumulating a signal charge corresponding to a line period of a video signal in a solid-state imaging element section S, in a period (a+b) extending over period a and period b, and then a signal charge is accumulated in light receiving part Ln+1, which is a row of light receiving elements for accumulating a signal charge corresponding to the next line period of a video signal in the solid-state imaging element section S, in a period (b+c) extending over period b and period c (c=a), the amount of the signal charge accumulated in the light receiving part Ln in the period a+b is proportional to the sum of area Aa and area Ab (area Aa+Ab) and the amount of the signal charge accumulated in the light receiving part Ln+1 in the period b+c is proportional to the sum of area Ab and area Ac (area Ab+Ac). Each of the period a and the period c corresponds to a line period of the video signal and each of the period a+b and the period b+c corresponds to a frame period of the video signal.

Thus, the light receiving part Ln and the light receiving part Ln+1 show the same duration for an electric charge accumulation time (exposure time) but the timing of the electric charge accumulation time of the latter part is shifted from the timing of the electric charge accumulation time of the former part by a period corresponding to a line period of the video signal. In the case of FIG. 3, the period of fluctuations of the luminance of the light source illuminating the subject (½ of the period of the AC power supply) and the frame period of the video signal do not show a relationship that one is integer times of the other.

As clearly seen from FIG. 3, the area Aa+Ab and the area Ab+Ac commonly include the area Ab and hence the difference between them is equal to the difference between the area Aa and the area Ac. Therefore, the amount of the signal charge accumulated in the light receiving part Ln in the period a+b and the amount of the signal charge accumulated in the light receiving part Ln+1 in the period b+c show a difference that corresponds to the difference between the area Aa and the area Ac.

In this way, the amount of the signal charge that corresponds to a line period of the video signal and is accumulated in the light receiving part, which is a row of light receiving elements for accumulating a signal charge corresponding to a ling period and sending it out in the solid-state imaging element section S, periodically changes according to the periodic fluctuations of the luminance of the light source illuminating the subject. Then, the periodic change in the amount of the signal charge that is accumulated in the light receiving part and corresponds to a line period of the video signal appears as periodic fluctuations of the luminance level of the video signal to make the video signal contain a flicker component.

The image of a frame period that is reproduced according to the video signal that contains such a flicker component typically shows light and dark stripes running along the lines (in the horizontal direction) in FIG. 4.

Under these circumstances, several proposals have been made to date for flicker correction of reducing the clicker components contained in the video signal obtained from an image pickup apparatus comprising a solid-state imaging element when the image pickup apparatus is operated to pick up an image of a subject illuminated by a fluorescent lamp.

One of such proposals is known to those skilled in the art. According to the proposal, the flicker component contained in a video signal is reduced by making an electric charge accumulation period, which corresponds to a frame period of the video signal, of each light receiving part of the solid-state imaging element section for accumulating a signal charge corresponding to a line period of the video signal and sending it out equal to integer times of the flicker period of the fluorescent lamp so as to make the amount of the signal charge accumulated in a light receiving part substantially always show a constant level.

According to another proposal as described in Jpn. Pat. Appln. Laid-Open Publication No. 2000-004382, when the field rate (twice of the frame rate) of the video signal is 60 Hz and the field period is 1/60 sec while the power supply frequency of the fluorescent lamp is 50 Hz and the flicker period of the fluorescent lamp is 1/100 sec so that the fluorescent lamp flickers five times in every three field periods of the video signal and hence a same flicking pattern is repeated with a period equal to the three field periods of the video signal, the video signal is accumulated in a memory means by an amount corresponding to the number of field periods that by turn corresponds to the period of repetition of the flicker component or the integrated value thereof and the flicker component contained in the video signal is approximated by a sinusoidal wave signal. Then, the flicker component contained in the video signal is reduced by utilizing the characteristics of the sinusoidal wave signal and the video signal accumulated in the memory means or the integrated value thereof.

DISCLOSURE OF THE INVENTION

Problems to be Solved by the Invention

The above-described known flicker correction methods of reducing the flicker component contained in the video signal obtained from an image pickup apparatus have problems. Firstly, with the flicker correction method of the proposal cited above as known to those skilled in the art, it is necessary to make an electric charge accumulation period, which corresponds to a frame period of the video signal, of each light receiving part of the solid-state imaging element section for accumulating a signal charge corresponding to a line period of the video signal and sending it out equal to integer times of the flicker period of the fluorescent lamp. Thus, once the flicker period of the fluorescent lamp is given, it is not allowed to change the frame rate of the video signal. Such a method lacks general applicability.

With the flicker correction method described in the above-cited Jpn. Pat. Appln. Laid-Open Publication No. 2000-004382, when the field rate of the video signal is changed and the number of field periods that corresponds to the repetition period of flicker component is increased, the storage capacity of the memory means necessary for storing the video signal or the integrated value thereof of the field periods, the number of which corresponds to the repetition period of flicker component needs to be increased. Thus, such a method also lacks general applicability and is not a realistic measure. Additionally, the method does not provide the effect of reducing the flicker component contained in a video signal when the flicker period of the fluorescent lamp whose power supply frequency is 60 Hz is 1/120 sec while the field rate (twice of the frame rate) of the video signal is 60 Hz and the field period is 1/60 sec.

In view of the above-identified circumstances, it is the object of the present invention to provide a flicker correction method that can reliably and accurately reduce the flicker component contained in a video signal when the video signal is any of various video signals having different respective frame periods or some other specific periods or when the flicker component contained in the video signal is any of various flicker components having different respective repetition periods, a flicker correction circuit adapted to use such a method and also an image pickup apparatus realized by employing such a flicker correction method and such a flicker correction circuit.

According to the present invention, the above object is achieved by providing a flicker correction method including: acquiring a flicker correction signal corresponding to the flicker component contained in a video signal formed as a succession of specific periods for each of the specific periods in response to a correction error signal for each of the specific periods; forming a corrected video signal of a specific period corrected for the flicker component by executing an arithmetic process on the flicker correction signal and the video signal for each of the specific periods; and detecting the correction error on the flicker component from the corrected video signal of the specific period immediately preceding each of the specific periods and the corrected video signal of the each of the specific periods, acquiring the correction error signal as a signal corresponding to the detected correction error and the flicker correction signal as a signal for reducing the correction error according to the correction error signal.

According to the present invention, there is also provided a flicker correction circuit including: a flicker correction signal sending out section that sends out a flicker correction signal corresponding to the flicker component contained in a video signal of each of specific periods, the video signal being formed as a succession of specific periods and containing a flicker component, in response to a correction error signal for each of the specific periods; an arithmetic processing section that executes an arithmetic process on the flicker correction signal sent out from the flicker correction signal sending out section and the video signal of each of the specific periods to form a corrected video signal of the specific period corrected for the flicker component; and a correction error detecting section that detects the correction error on the flicker component from the corrected video signal of the specific period immediately preceding each of the specific periods and the corrected video signal of the each of the specific periods, acquiring the correction error signal of each of the specific periods as a signal corresponding to the detected correction error, supplying the correction error signal to the flicker correction signal sending out section, and acquiring the flicker correction signal as a signal for reducing the correction error according to the correction error signal.

According to the present invention, there is also provided an image pickup apparatus including: an imaging element section that has an imaging surface section formed by arranging a plurality of photoelectric conversion pixels; a video signal forming section that forms a video signal according to the imaging output signal from the imaging element section; a flicker correction circuit including a flicker correction signal sending out section that sends out a flicker correction signal corresponding to the flicker component contained in the video signal of each of specific periods acquired from the video signal forming section, in response to a correction error signal for each of the specific periods, an arithmetic processing section that executes an arithmetic process on the flicker correction signal sent out from the flicker correction signal sending out section and the video signal of each of the specific periods to form a corrected video signal of the specific period corrected for the flicker component, and a correction error detecting section that detects the correction error on the flicker component from the corrected video signal of the specific period immediately preceding each of the specific periods and the corrected video signal of the each of the specific periods, acquires the correction error signal of each of the specific periods as a signal corresponding to the detected correction error, supplies the correction error signal to the flicker correction signal sending out section, and acquires the flicker correction signal as a signal for reducing the correction error according to the correction error signal; and a signal processing section that executes a signal process on the corrected video signal acquired from the flicker correction circuit to form an output video signal.

Thus, according to the present invention as defined above, a flicker correction signal and a video signal of a specific period are subjected to an arithmetic process so that the flicker correction signal reduces the correction error of the flicker component of the video signal when forming a corrected video signal for the specific period for which the flicker component is corrected. Thus, it is possible to obtain a corrected video signal from which the flicker component is effectively reduced and reliably and accurately reduce the flicker component contained in a video signal when the video signal is any of various video signals having different respective frame periods or some other specific periods or when the flicker component contained in the video signal is any of various flicker components having different respective repetition periods.

Other objects and advantages of the present invention will become apparent from embodiments to be described later.

BEST MODE FOR CARRYING OUT THE INVENTION

Now, the present invention will be described in greater detail by referring to the accompanying drawings that illustrate preferred embodiments of the present invention. Note, however, the present invention is by no means limited to the embodiments described below, which may be modified in various different ways without departing from the spirit and scope of the invention.

Figure 5:
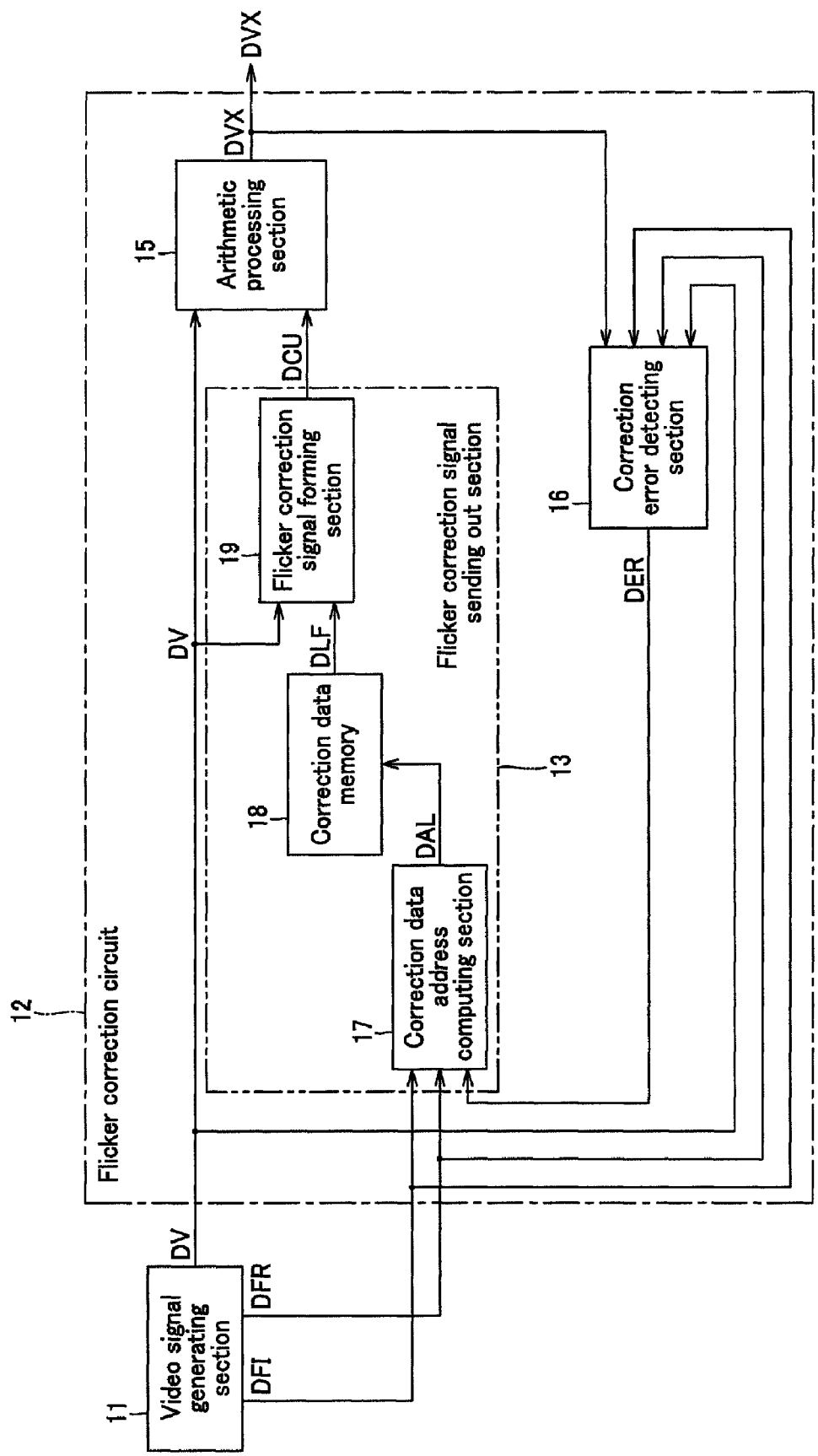
FIG. 5 is a schematic block diagram of an embodiment of flicker correction circuit that executes a flicker correction method according to the present invention.

A flicker correction method according to the invention is embodied typically by means of a flicker correction circuit having a configuration as illustrated in FIG. 5.

FIG. 5 is a schematic block diagram of an embodiment of flicker correction circuit 12 according to the present invention, which also shows a video signal generating section 11 connected to it.

In the embodiment of FIG. 5, the video signal generating section 11 that typically includes an image pickup apparatus such as a color video camera sends out digital video signal DV, which is formed as a succession of frame periods and contains a flicker component, the AC power supply frequency of the fluorescent lamp illuminating the subject that is being shot by the image pickup apparatus (the reciprocal of the twice of the period of luminance fluctuations of the fluorescent lamp), flicker information signal DFI that indicates the period of the flicker component contained in the digital video signal DV that corresponds to the frame rate and the line rate of the digital video signal DV and frame information signal DFR that indicates the frame period of the digital video signal DV.

The digital video signal DV, the flicker information signal DFI and the frame information signal DFR are then supplied from the video signal generating section 11 to the flicker correction circuit 12.

The flicker correction circuit 12 includes a flicker correction signal sending out section 13, which by turn includes a correction data address computing section 17, a correction data memory 18 and a flicker correction signal forming section 19, an arithmetic processing section 15 and a correction error detecting section 16.

The digital video signal DV from the video signal generating section 11 is supplied to the flicker correction signal sending out section 13, the arithmetic processing section 15 and the correction error detecting section 16 of the flicker correction circuit 12. Corrected digital video signal DVX is obtained from the arithmetic processing section 15 as a result of correcting the digital video signal DV by reducing the flicker component in every frame period as will be described in greater detail hereinafter. The corrected digital video signal DVX is then sequentially sent out from the flicker correction circuit 12 on a frame period by frame period basis and also supplied to the correction error detecting section 16 in the flicker correction circuit 12.

Additionally, the flicker information signal DFI and the frame information signal DFR from the video signal generating section 11 are supplied to the flicker correction signal sending out section 13 and the correction error detecting section 16. Correction error signal DER that corresponds to the correction error on the flicker component is obtained for each frame period from the corrected digital video signal DVX, the configuration of which will be described in greater detail hereinafter, and supplied to the flicker correction signal sending out section 13.

The flicker information signal DFI and the frame information signal DFR from the video signal generating section 11 and the correction error signal DER from the correction error detecting section 16 are supplied to the correction data address computing section 17 of the flicker correction signal sending out section 13. Then, the correction data address computing section 17 sends out memory address signal DAL that indicates the memory address in the correction data memory 18 for each part of the digital video signal DV that corresponds to a frame period, which memory address signal DAL is then supplied to the correction data memory 18.

Figure 1:
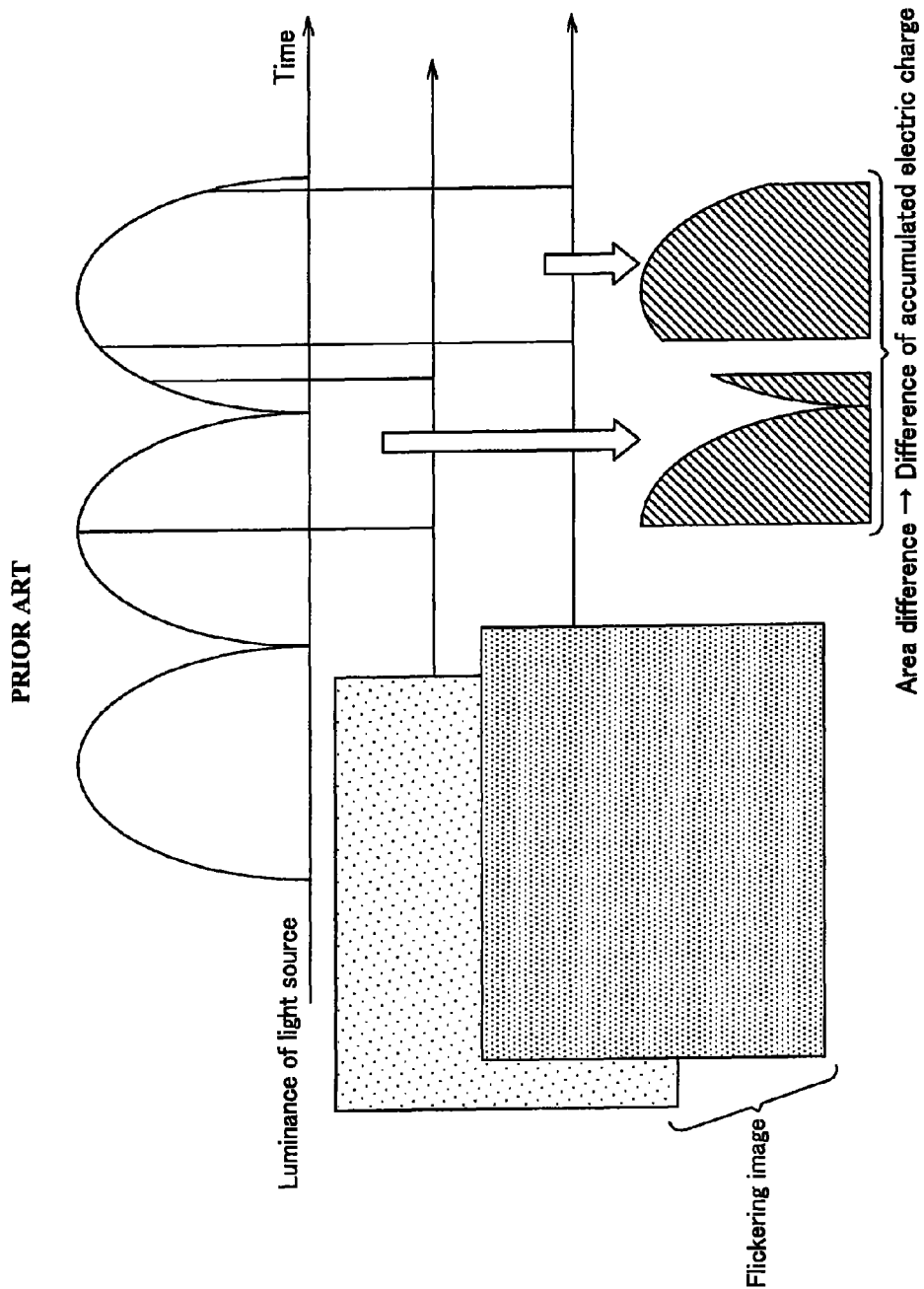
FIG. 1 is a schematic illustration of the change in the amount of the electric charge accumulated in an image sensor employing a global shutter system.
Figure 2:
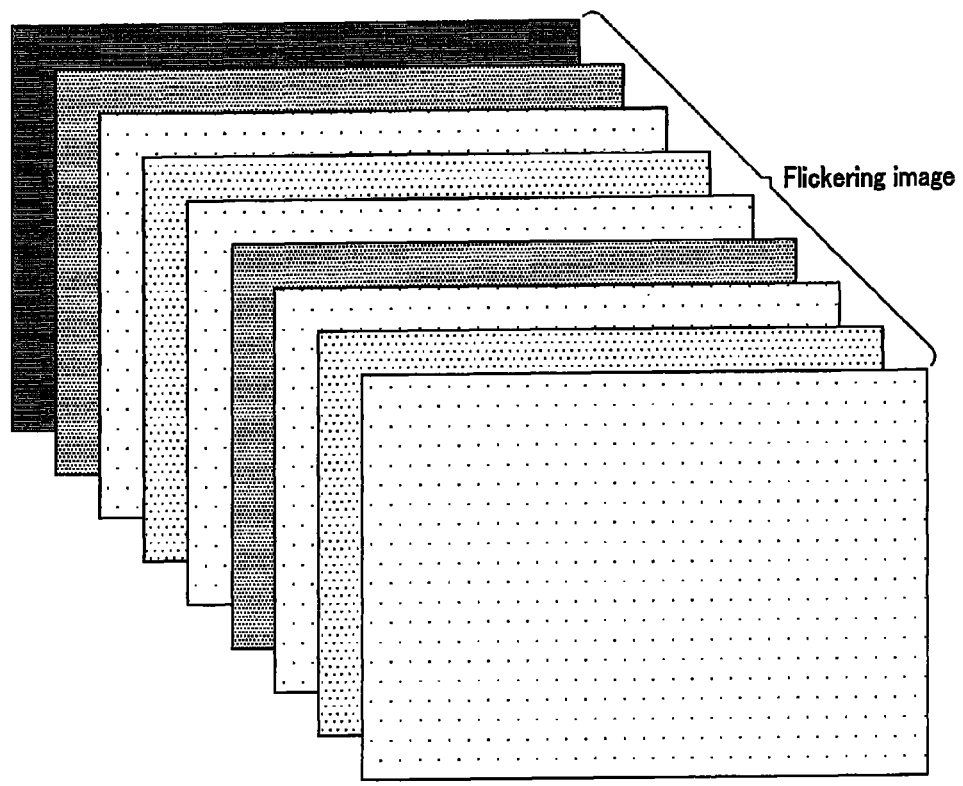
FIG. 2 is a schematic illustration of an image showing a frame flicker that appears due to a global shutter system.
Figure 3:
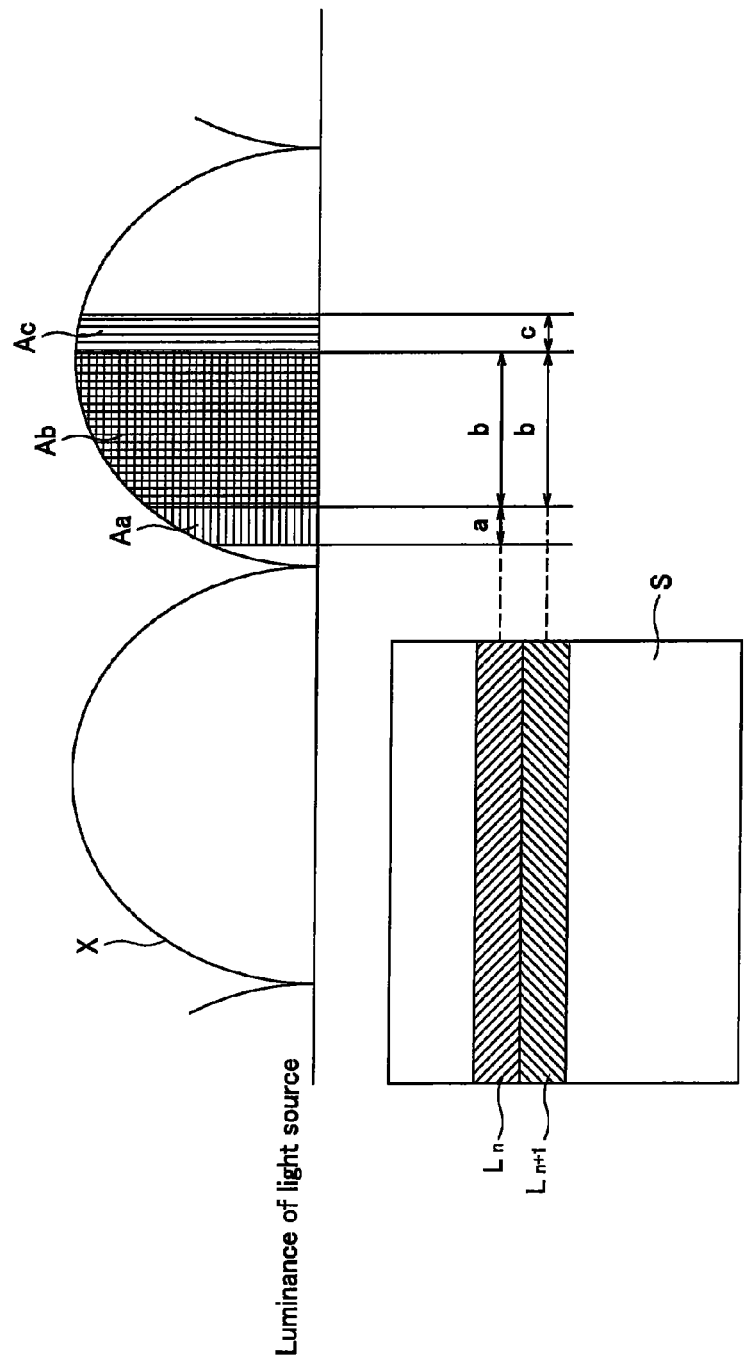
FIG. 3 is a schematic illustration of the change in the amount of the electric charge accumulated in an image sensor employing a rolling shutter system.
Figure 4:
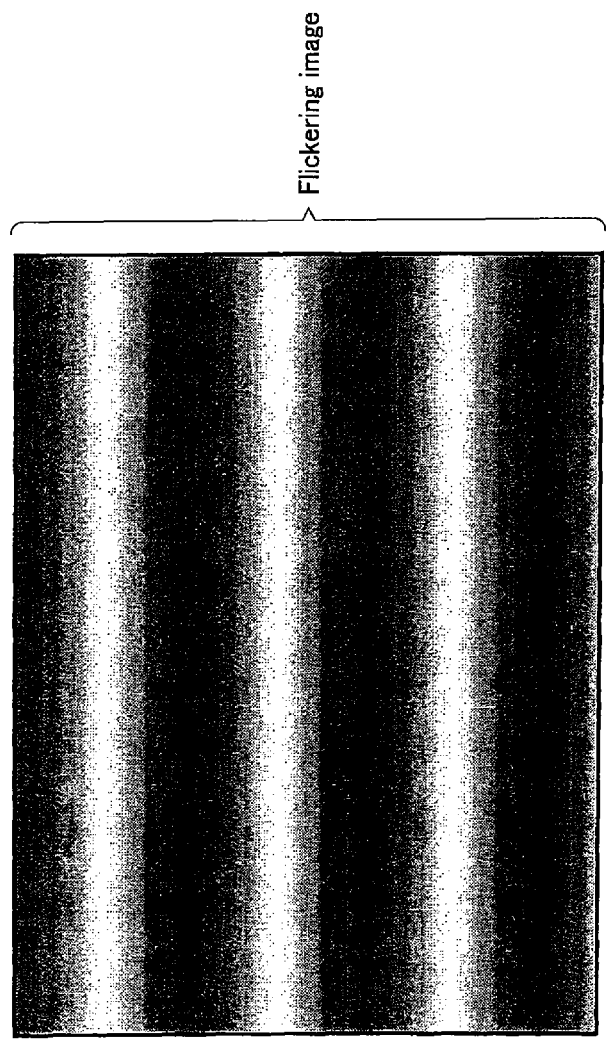
FIG. 4 is a schematic illustration of an image showing a line flicker that appears due to a rolling shutter system.

The correction data memory 18 stores correction data for reducing the flicker component contained in each part of the digital video signal DV corresponding to a frame period for each of the plurality of line periods of each frame period. The flicker component contained in each part of the digital video signal DV corresponding to a frame period appears substantially as fluctuations in a sinusoidal waveform for the luminance level of the digital video signal DV and hence can be approximated by a sinusoidal wave signal. The correction data memory 18 stores data indicating the levels of the sinusoidal wave signal at a large number of sampling points in a ¼ period of the signal with corresponding memory addresses typically as shown in FIG. 2 where the horizontal axis indicates the phase and the vertical axis indicates the level.

The correction data that corresponds to the memory address indicated by the memory address signal DAL computationally determined by the correction data address computing section 17 and supplied to the correction data memory 18 are read out from the correction data memory 18 and supplied to the flicker correction signal forming section 19 as correction data DLF. The flicker correction signal forming section 19 has adjusted correction levels obtained by adjusting the correction level indicated by the correction data DLF for each of the plurality of pixels in each of the plurality of line periods of each frame period of the digital video signal DV and sequentially form flicker correction signals DCU that correspond to the respective pixels in each of the plurality of line periods of each frame period of the digital video signal DV.

The arithmetic processing section 15 executes an arithmetic process for each of the pixels in each of the plurality of line periods of each frame period and the flicker correction signals DCU sent out from the flicker correction signal sending out section 13 for each frame period of the digital video signal DV transmitted from the video signal generating section 11, corrects the digital video signal DV to reduce the flicker in each of the plurality of line periods of the frame period and sequentially leads out the corrected digital video signal DVX obtained by correcting the digital video signal DV for the flicker on a frame period by frame period basis. The corrected digital video signal DVX sequentially led out from the arithmetic processing section 15 on a frame period by frame period basis in this way is then sent out from the flicker correction circuit 12 as output signal thereof and also supplied to the correction error detecting section 16 of the flicker correction circuit 12.

The correction error detecting section 16 detects the correction error in the corrected digital video signal DVX for the flicker component in each frame period on the basis of the corrected digital video signal DVX sequentially supplied from the arithmetic processing section 15 on a frame period by frame period basis, the flicker information signal DFI and the frame information signal DFR frame the video signal generating section 11 and the digital video signal DV from the video signal generating section 11 to generate a correction error signal DER that corresponds to the detected correction error and supplies the correction error signal DER to the correction data address computing section 17 of the flicker correction signal sending out section 13. As the correction error detecting section 16 supplies the correction error signal DER to the correction data address computing section 17 in this way, the memory address signal DAL that is subsequently computationally determined by the correction data address computing section 17 can reduce the correction error on the flicker component in each frame period of the corrected digital video signal DVX as detected by the correction error detecting section 16.

This means that the correction error signal DER obtained from the correction error detecting section 16 can reduce the correction error on the flicker component in each frame period of the corrected digital video signal DVX according to the correction error signal DER and that the correction error detecting section 16 makes flicker correction signal DCU from the flicker correction signal sending out section 13 capable of reducing the correction error of the flicker component in each frame period of the corrected digital video signal DVX according to the correction signal DER.

Now, a specific configuration of the correction data address computing section 17 of the flicker correction signal sending out section 13 will be described below by referring to FIG. 7 as an example. The correction data address computing section 17 of FIG. 7 includes an initial line address data computing section 21, a line address increment computing section 22 and a line address data computing section 23.

In the correction data address computing section 17, the initial line address data computing section 21 computationally determines the memory address that corresponds to the first line period in each frame period of the digital video signal DV according to the flicker information signal DFI and the frame information signal DFR from the video signal generating section 11 and the correction error signal DER obtained from the correction error detecting section 16 and generates a memory address signal DAa that indicates the computationally determined memory address. At the same time, the line address increment computing section 22 computationally determines the increment to the memory address for each of the line periods of each frame period of the digital video signal DV according to the flicker information signal DFI and the frame information signal DFR from the video signal generating section 11 to generate a memory address unit increment signal DAb that indicates the computationally determined increment to the memory address.

Figure 7:
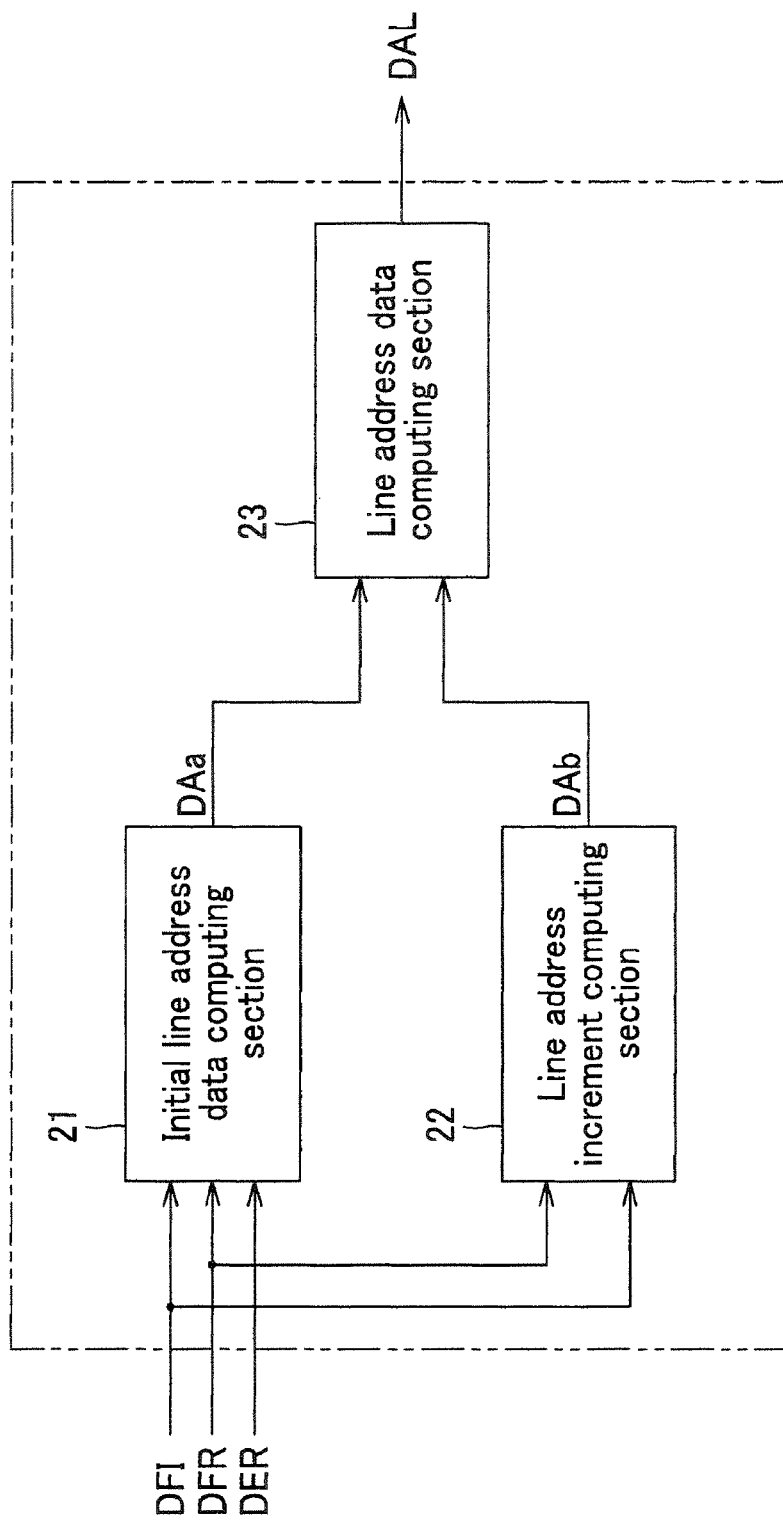
FIG. 7 is a schematic block diagram of the correction data address computing section of the flicker correction circuit of FIG. 5, showing the specific configuration thereof.

Additionally, in the specific configuration of the correction data address computing section 17 illustrated in FIG. 7, the line address data computing section 23 computationally determines the memory address that corresponds to each of the line periods of each frame period of the digital video signal DV and generates a memory address signal DAL that indicates the computationally determined memory address according to the memory address signal DAa from the initial line address data computing section 21 and the memory address unit increment signal DAb from the line address increment computing section 22. The generated memory address signal DAL is then sent out from the line address data computing section 23 and supplied to the correction data memory 18.

Thus, the correction data address computing section 17 computationally determines the address of the leading line of the frame in question from the power supply frequency and the frame rate and then the address of the current line by adding the address increment to the line next to the leading line and so on.

More specifically, when the power supply frequency is 50 Hz, the frame rate is 30 Hz and the clock number in the vertical direction of the imaging element is 1,125 clk, the period T of the rise and fall of a flicker is determined by formula 1 blow so as to be equal to 337.5 lines.

$$T = 30\ Hz \times 1{,}125\ clk / (50\ Hz \times 2) \quad (1)$$
$$= 337.5[clk]$$

The ROM in the system stores the flicker data obtained by dividing a period by 512 so that the address of the ROM is incremented by about 1.51703 for the next line as determined by formula 2 below.

$$512/337.5 = 1.51703 \quad (2)$$

Thus, when the correction wave address of the leading line is 0, the address of the 100-th line is determined to be equal to 152 by formula 3 shown below.

$$0 + 1.51703 \times 100 \approx 152 \quad (3)$$

Figure 8:
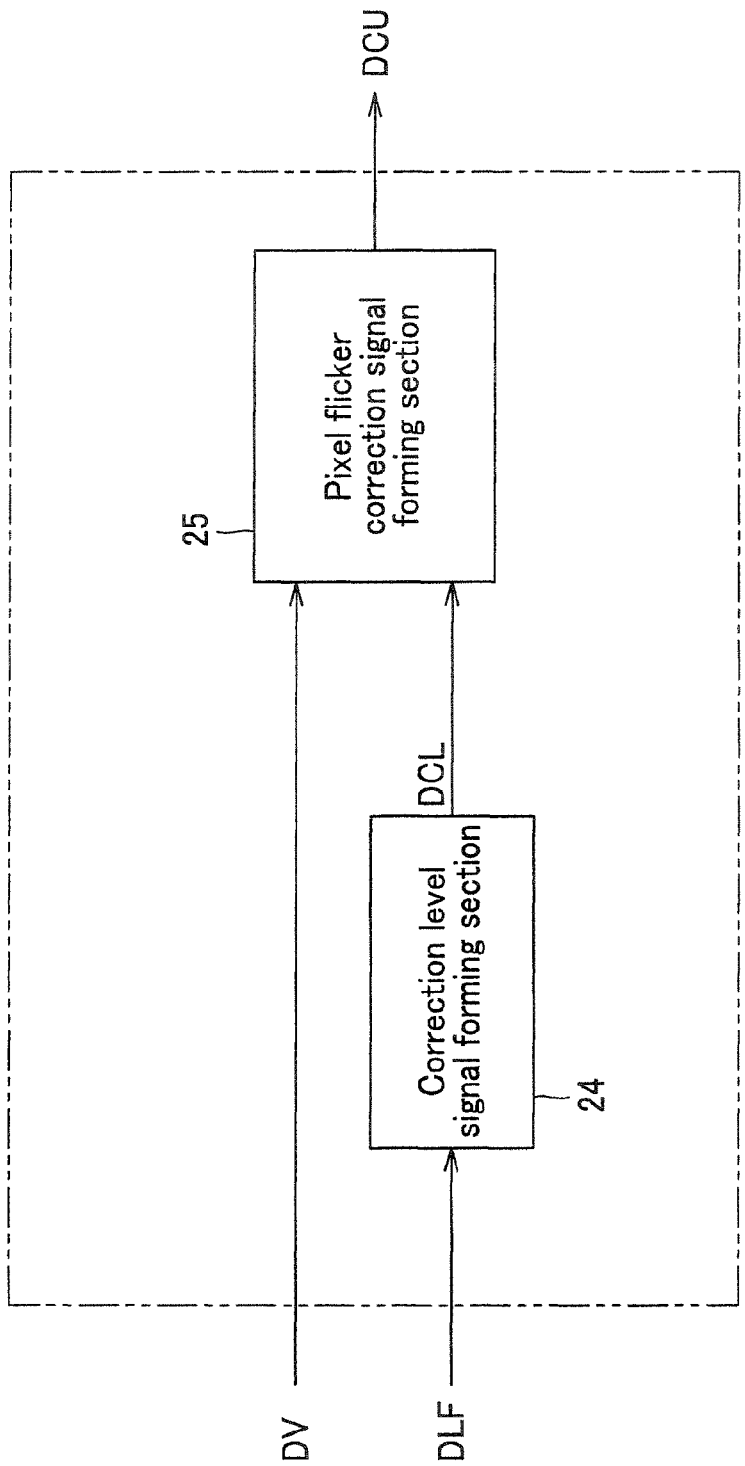
FIG. 8 is a schematic block diagram of the flicker correction signal forming section of the flicker correction circuit of FIG. 5, showing the specific configuration thereof.

Now, a specific configuration of the flicker correction signal forming section 19 of the flicker correction signal sending out section 13 will be described below by referring to FIG. 8. Referring to FIG. 8, the flicker correction signal forming section 19 includes a correction level signal forming section 24 and a pixel flicker correction signal forming section 25. In the flicker correction signal forming section 19, the correction level signal forming section 24 generates a correction level signal DCL showing the correction level indicated by the correction data DLF for reducing the flicker component of each of the line periods of each frame period of the digital video signal DV obtained from the correction data memory 18. The pixel flicker correction signal forming section 25 is supplied with the digital video signal DV and the correction level signal DCL from the correction level signal forming section 24. Then, the pixel flicker correction signal forming section 25 adjusts the level of each of the plurality of pixels contained in each of the plurality of line periods of each frame period of the digital video signal DV for the correction level signal DCL and generates a pixel flicker correction signal that corresponds to each of the pixels of each of the plurality of line period of each frame period of the digital video signal DV, which pixel flicker correction signal is then sent out as flicker correction signal DCU.

The above-described operation of the pixel flicker correction signal forming section 25 of adjusting the level of each of the plurality of pixels contained in each of the plurality of line periods of each frame period of the digital video signal DV for the correction level signal DCL is conducted typically in such a way that the level of the correction level signal DCL is proportional to the luminance level of each pixel. This is because it is found by actual observations that the luminance level of each pixel tends to show a proportional relationship with the luminance level of the flicker component that corresponds to the pixel.

Figure 9:
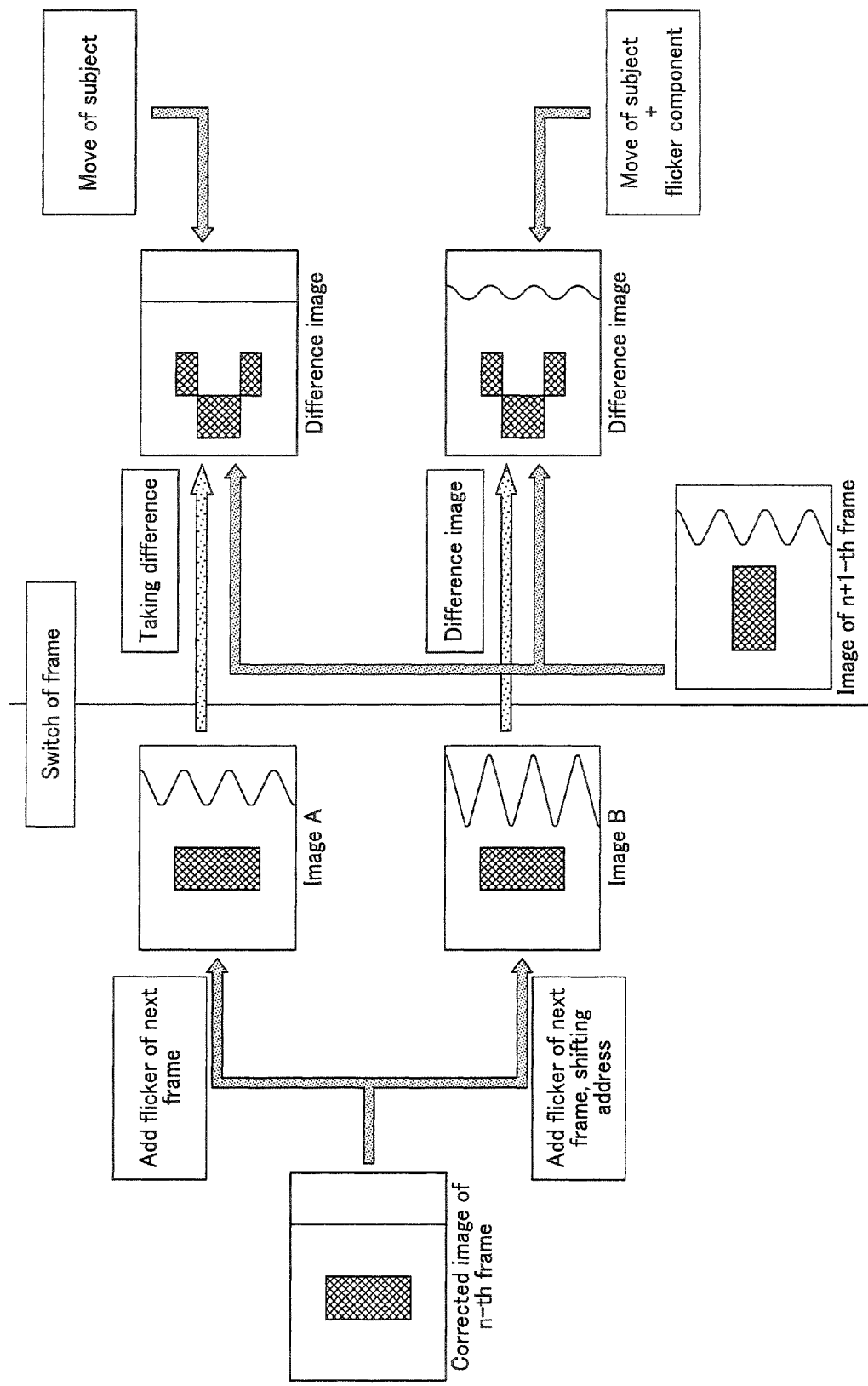
FIG. 9 is a schematic illustration of the correction error detection algorithm of the correction error detecting section of the flicker correction circuit of FIG. 5.

The correction error detecting section 16 of the flicker correction circuit 12 detects correction errors by means of the algorithm shown in FIG. 9.

Namely, after outputting "the corrected image of the n-th frame", a flicker component is added to "the corrected image of the n-th frame" by predicting the flicker condition of the n+1-th frame. The image that is obtained as a result is referred to as "image A" here. At the same time, the image that is obtained by predicting the flicker condition of the n+1-th frame and formed by adding the flicker component after shifting the address is referred to as "image B". When "the image of the n+1-th frame" that contains a flicker component is subtracted from the two images, only the move of the subject is output as differential image for "the image A" but both of the move of the subject and the flicker component are output as differential image for "the image B". Thus, the difference of "the image A" is smaller when the differences are compared with each other. Conversely, when the difference obtained from "the image B" is smaller than the difference obtained from "the image A", it is safe to assume that the flicker is correctly predicted when the address is shifted. In other words, the flicker is correctly predicted for the image showing a smaller difference so that it is possible to converge the correction error to within a certain range by shifting the address in the direction that reduces the difference.

Now, a specific configuration of the correction error detecting section 16 will be described below by referring to FIG. 10. The correction error detecting section 16 illustrated in FIG. 10 includes a flicker data address computing section 31 to which the flicker information signal DFI and the frame information signal DFR from the video signal generating section 11 and the correction error signal DER are supplied, address conversion sections 32, 33 to which the memory address signal DDL is supplied from the flicker data address computing section 31, flicker data memories 34, 35 that store flicker data, flicker signal forming sections 36, 40 and arithmetic processing sections 37, 41 to which the corrected digital video signal DVX obtained by correcting the flicker by the flicker correction circuit 12, line integrator sections 38, 42 to which the flicker-added digital video signals DVXP, DVXN are supplied respectively from the arithmetic processing sections 37, 41, memories 39, 43 to which the line integral output signals DIP, DIN obtained by integration respectively by the line integrator sections 38, 42, a line integrator 45 and a to-be-read-out control signal forming section 46 to which the digital video signal DV is supplied from the video signal generating section 11, difference detecting sections 47, 48 to which the line integration output signal DIV obtained as a result of integration by the line integrator 45 and the line integral output signals DIP, DIN read out respectively from the memories 39, 43, integrators 49, 51 to which the difference signals SP, SN detected respectively by the difference detecting sections 47, 48 are supplied and a comparator 50 to which the integration data SPI, SNI obtained respectively by the integrators 49, 51 are supplied. The memories 39, 43 are controlled by the to-be-read-out control signal forming section 46 and the correction error signal DER obtained as a result of the comparison by the comparator 47 is supplied to the flicker data address computing section 31.

The flicker data address computing section 31 of the correction error detecting section 16 sends out a memory address signal DDL that indicates a memory address in the flicker data memory 34 and a memory address in the flicker data memory 35 for each frame period of the corrected digital video signal DVX and the memory address signal DDL is supplied to the address conversion sections 32, 33. The address conversion section 32 converts the memory address indicated by the memory address signal DDL into an advanced/converted memory address that shows a shift in the advancing direction by a predetermined amount by adding the predefined address amount to the memory address indicated by the memory address signal DDL and subsequently generates a converted memory address signal DPL that indicates the advanced/converted memory address. The converted memory address signal DPL obtained form the address conversion section 32 is supplied to the flicker data memory 34. On the other hand, the address conversion section 33 converts the memory address indicated by the memory address signal DDL into a retreated/converted memory address that shows a shift in the retreating direction by a predetermined amount by subtracting the predetermined address amount from the memory address indicated by the memory address signal DDL and subsequently generates a converted memory address signal DNL that indicates the retreated/converted memory address. The converted/memory address signal DNL obtained from the address conversion section 33 is supplied to the flicker data memory 35.

When the power supply frequency is 50[Hz], the frame rate is 30[Hz] and the number of clocks in the vertical direction of the sensor is 1,125 [clk] while the data stored in the ROM shows a period by every 512 and the address of the flicker component on the first line of the n-th frame is 0, the address of the flicker component of on the first line of the n+1-th frame is 171 ((0+1,125×512/337.5)%512=171). Then, it is sufficient for the predetermined address amount predefined in the address conversion sections 32, 33 to be smaller than the amount that corresponds to ½ of the period of the flicker component contained in each frame period of the digital video signal DV. More specifically, if the period is 337.5, it is sufficient for the predetermined address amount to be smaller than 168. While the accuracy is improved when the amount of the shift is small, a detection error can occur for the correction error when the amount of the shift is too small because the move of the subject needs to be taken into consideration when judging the outcome of correction. For practical applications, it is desirable to select an amount that corresponds to about ⅟₁₆ of the period of the flicker component contained in each frame period of the digital video signal DV.

Figure 6:
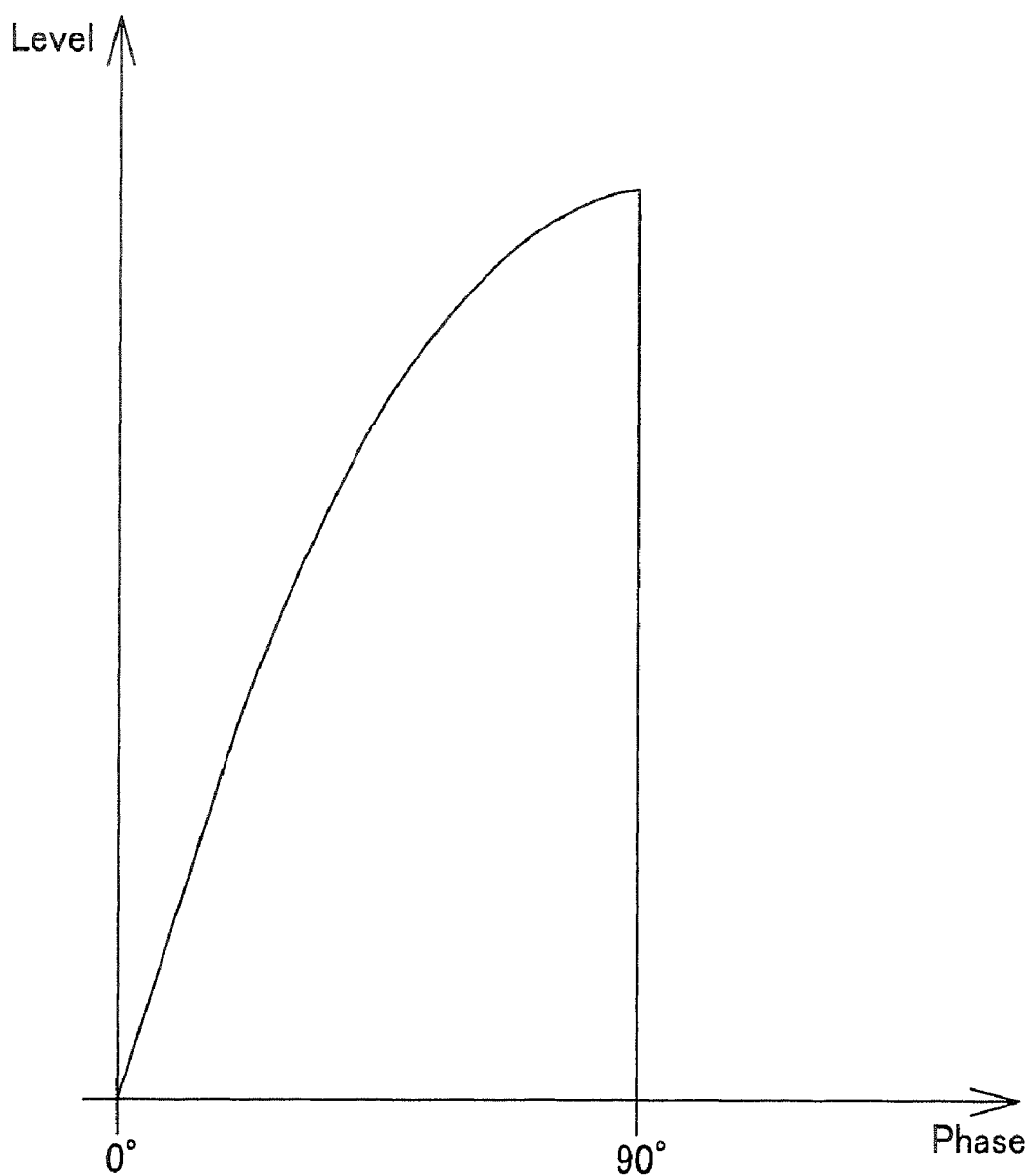
FIG. 6 is a waveform graph illustrating the flicker correction signal sending out section of the flicker correction circuit of FIG. 5.

The flicker data memory 34 and the flicker data memory 35 store flicker data that indicate the flicker component corresponding to the flicker component contained in each frame period of the digital video signal DV. The flicker component contained in each frame period of the digital video signal DV substantially appears as fluctuations in a sinusoidal waveform for the luminance level of the digital video signal DV and hence can be approximated by a sinusoidal wave signal. Thus, the flicker data memory 34 and the flicker data memory 35 stores data indicating the levels of the sinusoidal wave signal at a large number of sampling points in a ¼ period of the signal as flicker data with corresponding memory addresses typically as shown in FIG. 6.

Out of the flicker data stored in the flicker memory 34, the data of the advanced/converted memory address indicated by the converted memory address signal DPL that is obtained from the address conversion section 32 are read out and supplied to the flicker signal forming section 36 as flicker data DFP. The flicker signal forming section 36 is also supplied with the corrected digital video signal DVX sent out sequentially from the arithmetic processing section 15 for a frame period. Thus, the flicker signal forming section 36 adjusts the flicker level of each of the plurality of pixels contained in each of the plurality of line periods of each frame period of the corrected digital video signal DVX as indicated by the flicker data DFP according to the part of the corrected digital video signal DVX of each frame period and the flicker data DFP from the flicker data memory 34 and sequentially forms a flicker signal DUP that shows the adjusted flicker level and indicates the flicker component of each of the pixels of each of the plurality of line periods of each frame period of the corrected digital video signal DVX. The flicker signal DUP obtained from the flicker signal forming section 36 is supplied to the arithmetic processing section 37.

The arithmetic processing section 37 is also supplied with the corrected digital video signal DVX sequentially sent out from the arithmetic processing section 15 for a frame period. Then, the arithmetic processing section 37 executes an arithmetic process on each of the pixels in each of the plurality of line periods of each frame period of the corrected digital video signal DVX from the arithmetic processing section 15 and the flicker signals DUP sent out from the flicker signal forming section 36 for each of the plurality of line periods, adds the flicker component indicated by the flicker signal DUP to each of the pixels in each of the plurality of line periods of each frame period of the corrected digital video signal DVX and sequentially leads out the flicker-added digital video signal DVXP obtained by adding the flick component on a frame period by frame period basis. Thus, for each frame period, the flicker-added digital video signal DVXP is obtained by adding the predicted flicker component contained in the corresponding digital video signal DV for the next frame period to the corrected digital video signal DVX for the frame period.

The flicker-added digital video signal DVXP sequentially led out from the arithmetic processing section 37 for each frame period is then supplied to the line integrator section 38. The line integrator section 38 integrates the flicker-added digital video signal DVXP sent out from the arithmetic processing section 37 for each of the plurality of line periods of each frame period to produce a line integration output signal DIP and supplies it to a memory 39. The memory 39 sequentially stores and holds the line integration output signal DIP from the line integrator section 38.

Out of the flicker data stored in the flicker memory 35, on the other hand, the data of the retreated/converted memory address indicated by the converted memory address signal DNL obtained from the address conversion section 33 are read out and supplied to the flicker signal forming section 40 as flicker data DFN. The flicker signal forming section 40 is also supplied with the corrected digital video signal DVX sent out sequentially from the arithmetic processing section 15 for a frame period. Thus, the flicker signal forming section 40 adjusts the flicker level of each of the plurality of pixels contained in each of the plurality of line periods of each frame period of the corrected digital video signal DVX as indicated by the flicker data DFN according to the part of the corrected digital video signal DVX of each frame period and the flicker data DFN from the flicker data memory 35 and sequentially form a flicker signal DUN that shows the adjusted flicker level and indicates the flicker component of each of the pixels of each of the plurality of line periods of each frame period of the corrected digital video signal DVX. The flicker signal DUN obtained from the flicker signal forming section 40 is supplied to the arithmetic processing section 41.

The arithmetic processing section 41 is also supplied with the corrected digital video signal DVX sequentially sent out from the arithmetic processing section 15 for a frame period. Then, the arithmetic processing section 41 executes an arithmetic process on each of the pixels in each of the plurality of line periods of each frame period of the corrected digital video signal DVX from the arithmetic processing section 15 and the flicker signals DUN sent out from the flicker signal forming section 40 for each of the plurality of line period, adds the flicker component indicated by the flicker signal DUN to each of the pixels in each of the plurality of line periods of each frame period of the corrected digital video signal DVX and sequentially leads out the flicker-added digital video signal DVXN obtained by adding the flicker component on a frame period by frame period basis. Thus, for each frame period, the flicker-added digital video signal DVXN is obtained by adding the predicted flicker component contained in the corresponding digital video signal DV for the next frame period to the corrected digital video signal DVX for the frame period.

The flicker-added digital video signal DVXN sequentially led out from the arithmetic processing section 41 for each frame period is then supplied to the line integrator section 42. The line integrator section 42 integrates the flicker-added digital video signal DVXN sent out from the arithmetic processing section 41 for each of the plurality of line periods of each frame period to produce a line integration output signal DIN and supplies it to a memory 43. The memory 43 sequentially stores and holds the line integration output signal DIN from the line integrator section 42.

The line integrator sections 38, 42 respectively cut out the part of the flicker-added digital video signals DVXP, DVXN of each of the plurality of line periods of each frame period, or certain regions of the signals, integrate them in the horizontal direction and hold them on a line by line basis. The region may take any arbitrarily selected value so long as it is found within the image acquired in the horizontal direction. The accuracy of judgment of the outcome of correction is raised when a large region is selected. Integer times of a period of light and dark of flicker in the image may be used for the vertical direction but a half of a period may be used when an image does not contain a period of light and dark of flicker. More specifically, a value of 1,000 pixels may be selected in the horizontal direction and 1,000×675 of 675 pixels (337.5× 2) may be selected in the vertical direction.

Figure 10:
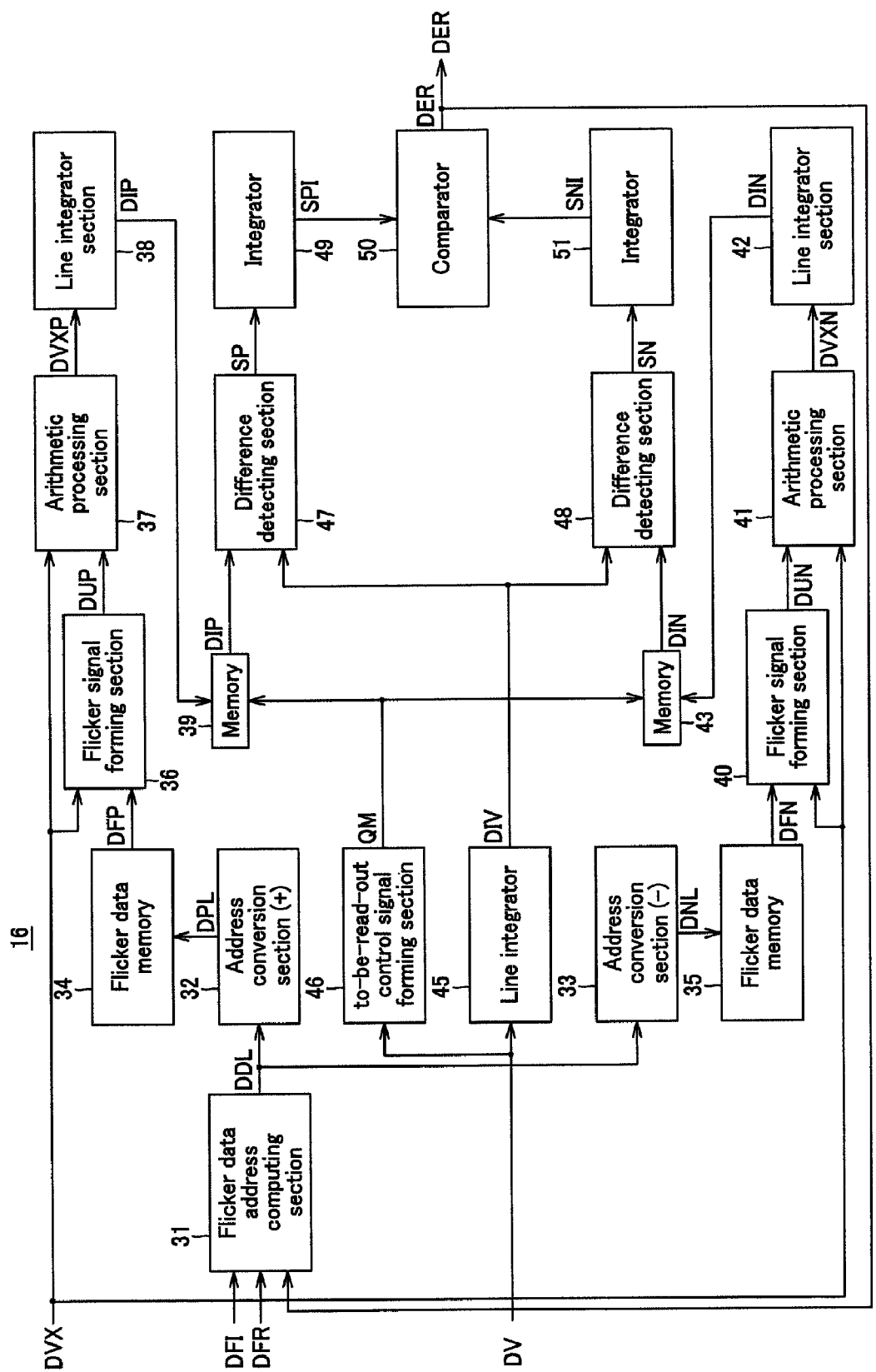
FIG. 10 is a schematic block diagram of the correction error detecting section of FIG. 9, showing the specific configuration thereof.

When the correction error detecting section 16 takes the specific configuration illustrated in FIG. 10, the digital video signal DV from the video signal generating section 11 is supplied to the line integrator 45 and the to-be-read-out control signal forming section 46.

As the to-be-read-out control signal forming section 46 gets the flicker-added digital video signal DVXN by the part of a frame period, e.g., the part of the n-th (n being a positive integer) frame period and the digital video signal DV by the part of the next frame period relative to the n-th frame period of the flicker-added digital video signal DVXN from the arithmetic processing section 41, or the part of the n+1-th frame period, it sends out a memory read out control signal QM and supplies it to the memory 39 and the memory 43. As a result, line integration output signal DIP that is based on the part of the flicker-added digital video signal DVXP of the n-th frame period is sequentially read out from the memory 39 and supplied to the difference detecting section 47. Also line integration output signal DIN that is based on the part of the flicker-added digital video signal DVXN of the n-th frame period is sequentially read out from the memory 43 and supplied to the difference detecting section 48.

Additionally, the line integrator 45 integrates the digital video signal DV for each of the plurality of line period of the n+1-th frame period to obtain a line integration output signal DIV and supplies it to the difference detecting section 47 and the difference detecting section 48.

Then, the difference detecting section 47 detects the difference between the line integration output signal DIP based on the part of the flicker-added digital video signal DVXP for the n-th frame period as read out from the memory 39 and the line integration output signal DIV based on the part of the digital video signal DV for the n+1-th frame period from the line integrator 45 and forms a difference signal SP that indicates the detected difference, which difference signal SP is then supplied to the integrator 49. The integrator 49 integrates the absolute value of the difference indicated by the difference signal SP for each frame period and supplies the obtained integration output signal SPI to the comparator 50.

Similarly, the difference detecting section 48 detects the difference between the line integration output signal DIN based on the part of the flicker-added digital video signal DVXN for the n-th frame period as read out from the memory 43 and the line integration output signal DIV based on the part of the digital video signal DV for the n+1-th frame period from the line integrator 45 and forms a difference signal SN that indicates the detected difference, which difference signal SN is then supplied to the integrator 51. The integrator 51 integrates the absolute value of the difference indicated by the difference signal SN for each frame period and supplies the obtained integration output signal SNI to the comparator 50.

Thus, each of the integration output signal SPI and the integration output signal SNI supplied to the comparator 50 respectively from the integrator 49 and the integrator 51 corresponds to the difference between the part of the corrected digital video signal DVX of each frame period to which the predicted flicker component is added as obtained from the arithmetic processing section 15 and the corresponding part of the digital video signal DV of each frame period that actually arrives and contains a flicker component and hence the integration output signal represents the correction error for the flicker component of the corrected digital video signal DVX obtained from the arithmetic processing section 15 for each frame period. Thus, the sections from the flicker data address computing section 31 all the way to the integrator 49 and the integrator 51 as a whole detects the correction error of the flicker component in the corrected digital video signal DVX for each frame period.

The comparator 50 compares the integration output signal SPI from the integrator 49 and the integration output signal SNI from the integrator 51 and determines which is larger. Then, it sends out its judgment as correction error signal DER. As a result, the correction error signal DER sent out from the comparator 50 corresponds to the correction error on the flicker component of the corrected digital video signal DVX obtained from the arithmetic processing section 15 for each frame period and hence takes a role of reducing the correction error of the flicker correction signal DCU obtained from the flicker correction signal sending out section 13 for the flicker component of the part of the corrected digital video signal DVX of each frame period according to the correction error signal DER.

Now, a specific configuration of the flicker data address computing section 31 will be described below by referring to FIG. 11. The flicker data address computing section 31 illustrated in FIG. 11 includes an initial line address data computing section 55, a line address increment computing section 56 and a line address data computing section 57. In the flicker data address computing section 31, the initial line address data computing section 55 computationally determines the memory address that corresponds to the part of the corrected digital video signal DVX for the first line period of each frame period obtained from the arithmetic processing section 15 on the basis of the flicker information signal DFI and the frame information signal DFR from the video signal generating section 11 and the correction error signal DER obtained from the comparator section 50 and generates a memory address signal DDa that indicates the computationally determined memory address. At the same time, the line address increment computing section 56 computationally determines the increment of the corrected digital video signal DVX for each of the line periods of each frame period on the basis of the flicker information signal DFI and the frame information signal DFR from the video signal generating section 11 and generates a memory address unit increment signal DDb that indicates the computationally determined increment to the memory address.

Figure 11:
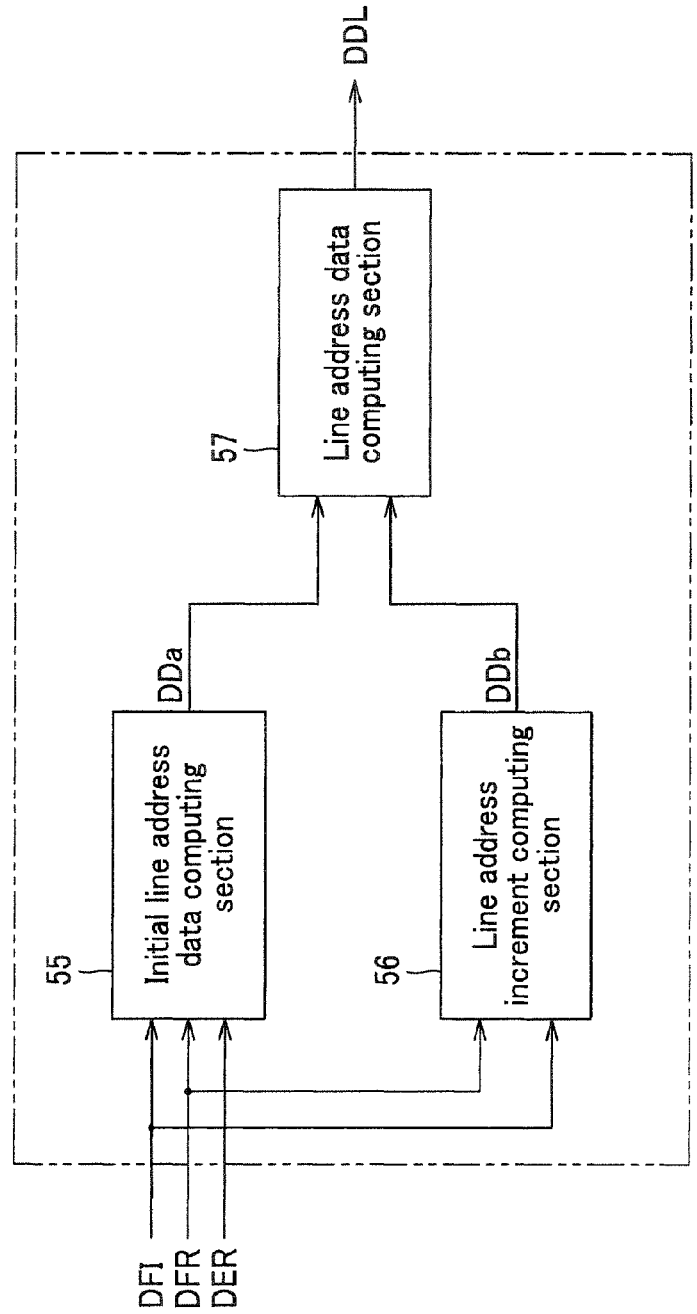
FIG. 11 is a schematic block diagram of the flicker data address computing section of the correction error detecting section of FIG. 9, showing the specific configuration thereof.

In the flicker data address computing section 31 having the specific configuration as illustrated in FIG. 11, the line address data computing section 57 computationally determines the memory address of the part of the corrected digital video signal DVX of each of the line periods of each frame period on the basis of the memory address signal DDa from the initial line address data computing section 55 and the memory address unit increment signal DDb from the line address increment computing section 56 and generates a memory address signal DDL that indicates the computationally determined memory address. The memory address signal DDL generated in this way is then sent out from the line address data computing section 57 and supplied to the address conversion section 32 and the address conversion section 33.

In the flicker correction circuit 12 having the above-described configuration, the flicker correction signal sending out section 13 forms a flicker correction signal DCU that corresponds to the flicker component contained in the digital video signal DV formed as a succession of frame periods and deemed to contain a flicker component for each frame period and the arithmetic processing section 15 executes an arithmetic process on the flicker correction signal DCU and the part of the digital video signal DV for the frame period to produce a corrected digital video signal DVX that is corrected for the flicker component for the frame period. At this time, the correction error detecting section 16 detects the correction error of the flicker component from the corrected digital video signal DVX of the frame period that immediately precedes the current frame period and the corrected digital video signal DVX of the current frame period on the basis of the flicker correction signal DCU corresponding to the flicker component contained in the corrected digital video signal DVX of the current frame period and obtains a correction error signal DER that corresponds to the detected correction error. Then, a corrected digital video signal DVX having a correction error for the flicker component that is reduced according to the correction error signal DER is formed.

Figure 12:
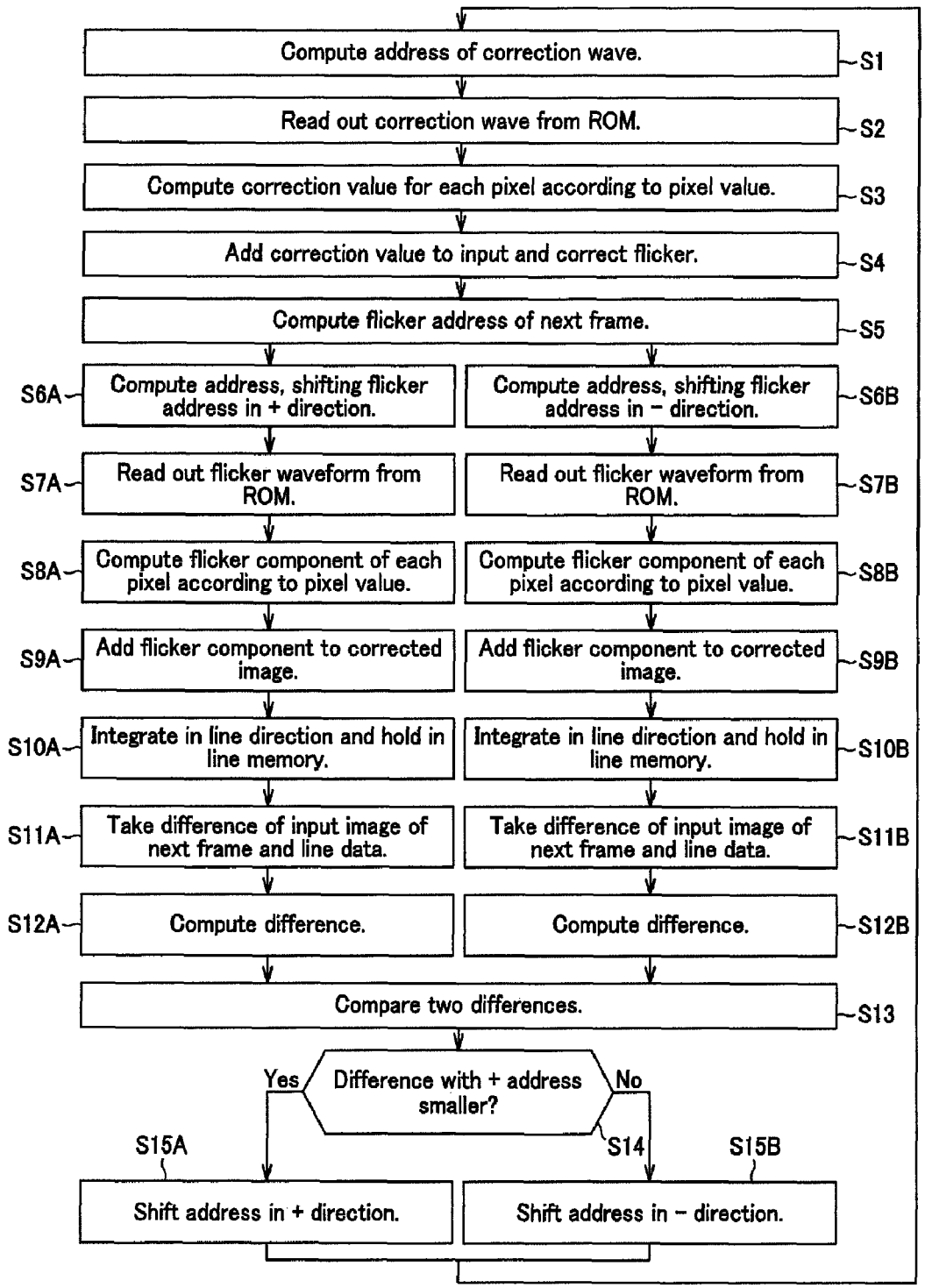
FIG. 12 is a flowchart of the flicker correction sequence of the flicker correction circuit of FIG. 5.
Figure 13:
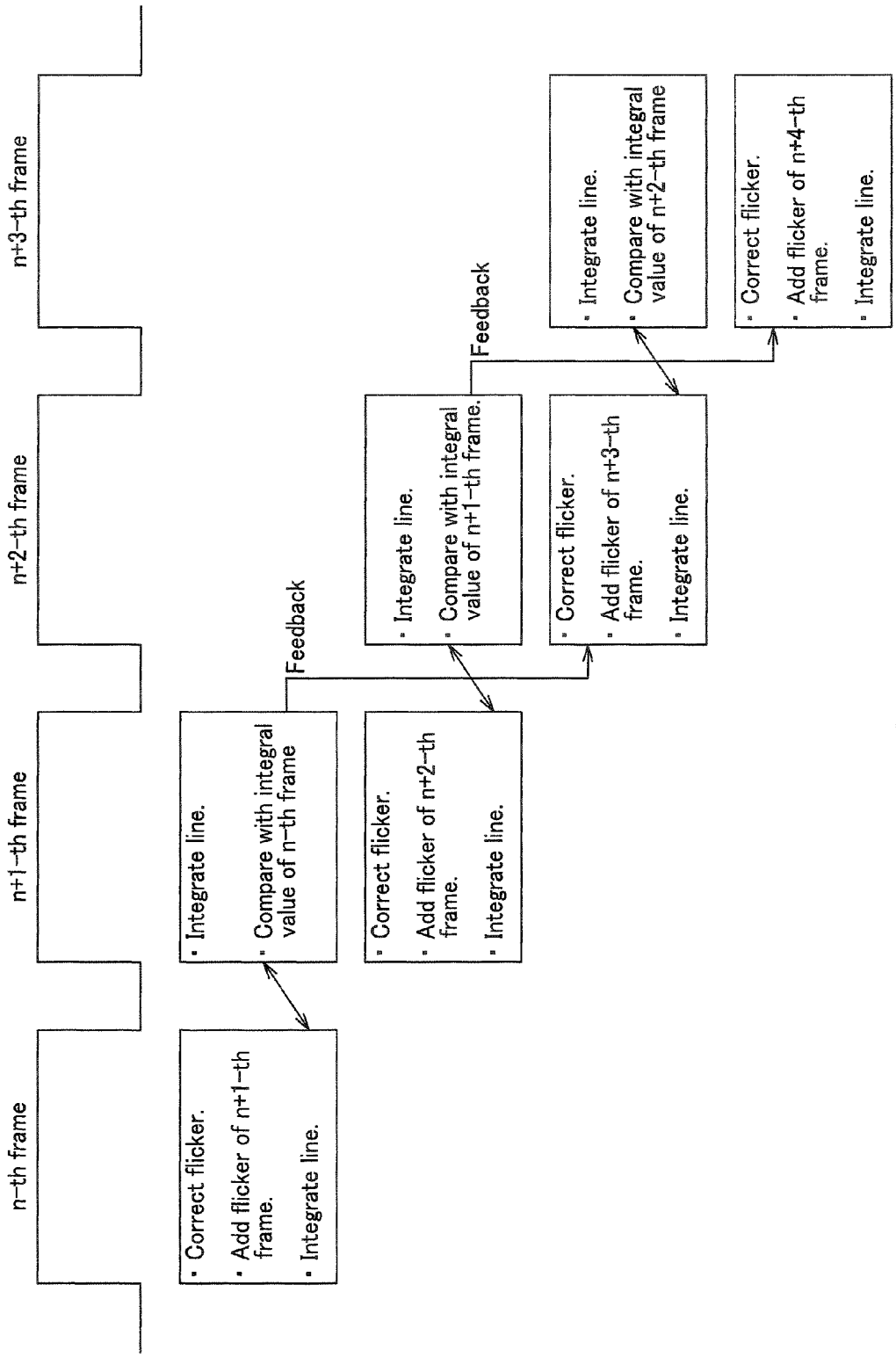
FIG. 13 is a flicker correction timing chart of the flicker correction circuit of FIG. 5.

The operation of flicker correction of the flicker correction circuit 12 proceeds by following the sequence illustrated in the flowchart of FIG. 12.

Referring to FIG. 12, firstly in Step S1, the correction data address computing section 17 of the flicker correction signal sending out section 13 computationally determines the memory address for reading out the correction data DLF for reducing the flicker component contained in the digital video signal DV of each frame period for each of the plurality of line periods of the frame period from the correction data memory 18. Then, in the next step, or Step S2, the correction data DLF is read out from the correction data memory 18 according to the memory address signal DAL indicating the memory address that is computationally determined by the correction data address computing section 17.

In the next step, or Step S3, the flicker correction signal forming section 19 sequentially forms a flicker correction signal DCU that corresponds to each pixel of each of the plurality of line periods of each frame period of the digital video signal DV on the basis of the part of the digital video signal DV of each frame period that contains a flicker component and is sent from the video signal generating section 11 and the correction data DLF read out from the correction data memory 18.

In the next step, or Step S4, the arithmetic processing section 15 performs a flicker correcting operation of reducing the flicker component contained in the digital video signal DV from the video signal generating section 11 by using the flicker correction signal DCU formed by the flicker correction signal forming section 19 of the flicker correction signal sending out section 13 and forms a corrected digital video signal DVX that is corrected for the flicker.

In the next step, or Step S5, the flicker data address computing section 31 of the correction error detecting section 16 computationally determines the memory address for reading out the flicker data that corresponds to each of the line periods of the next frame from the flicker data memories 34, 35 that respectively stores the flicker data DFP and DFN and forms a memory address signal DDL that indicates the computationally determined memory address.

In Step S6A, the address conversion section 32 converts the memory address indicated by the memory address signal DDL into an advanced/converted memory address that is shifted in the forward direction by a predetermined address amount and forms a converted memory address signal DPL that indicates the advanced/converted memory address. In the next step, or Step S7A, the flicker data DFP of the advanced/converted memory address indicated by the converted memory address signal DPL is read out from the flicker data memory 34.

In the next step, or Step S8A, the flicker signal forming section 36 generates a flicker signal DUP representing the flicker component that corresponds to each of the pixels of each of the plurality of line periods of each frame period of the corrected digital video signal DVX on the basis of the corrected digital video signal DVX of each frame obtained by the arithmetic processing section 15 and the flicker data DFP from the flicker data memory 34.

In the next step, or Step S9A, the arithmetic processing section 37 leads out a flicker-added digital video signal DVXP obtained by adding the flicker component indicated by the flicker signal DUP from the flicker signal forming section 36 to the corrected digital video signal DVX of each of the pixels of each of the plurality of line periods of each frame period coming from the arithmetic processing section 15.

In the next step, or Step S10A, the line integrator section 38 integrates the flicker-added digital video signal DVXP of each of the plurality of line periods of each frame period led out from the arithmetic processing section 37 and stores the obtained line integration output signal DIP in the memory 39.

In the next step, or Step S11A, the difference detecting section 47 detects the difference between the line integration output signal DIP of the current frame of the flicker-added digital video signal DVXP read out from the memory 39 and the line integration output signal DIV of the next frame of the digital video signal DV from the line integrator 45 and generates a difference signal SP representing the detected difference.

In the next step, or Step S12A, the integrator 49 produces an integration output signal SPI by integrating the absolute value of the difference indicated by the difference signal SP obtained by the difference detecting section 47 for each frame period.

On the other hand, in Step S6B, the address conversion section 33 converts the memory address indicated by the memory address signal DDL into a retreated/converted memory address that is shifted in the backward direction by a predetermined address amount and forms a converted memory address signal DNL that indicates the retreated/converted memory address. In the next step, or Step S7B, the flicker data DNP of the advanced/converted memory address indicated by the converted memory address signal DNL is read out from the flicker data memory 35.

In the next step, or Step S8B, the flicker signal forming section 40 generates a flicker signal DUN representing the flicker component that corresponds to each of the pixels of each of the plurality of line periods of each frame period of the corrected digital video signal DVX on the basis of the corrected digital video signal DVX of each frame obtained by the arithmetic processing section 15 and the flicker data DNP from the flicker data memory 35.

In the next step, or Step S9B, the arithmetic processing section 41 leads out a flicker-added digital video signal DVXN obtained by adding the flicker component indicated by the flicker signal DUN from the flicker signal forming section 40 to the corrected digital video signal DVX of each of the pixels of each of the plurality of line periods of each frame period coming from the arithmetic processing section 15.

In the next step, or Step S10B, the line integrator 42 integrates the flicker-added digital video signal DVXN of each of the plurality of line periods of each frame period led out from the arithmetic processing section 37 and stores the obtained line integration output signal DIN in the memory 43.

In the next step, or Step S11B, the difference detecting section 48 detects the difference between the line integration output signal DIN of the current frame of the flicker-added digital video signal DVXN read out from the memory 43 and the line integration output signal DIV of the next frame of the digital video signal DV from the line integrator 48 and generates a difference signal SN representing the detected difference.

In the next step, or Step S12B, the integrator 51 produces an integration output signal SNI by integrating the absolute value of the difference indicated by the difference signal SN obtained by the difference detecting section 48 for each frame period.

In the next step, or Step S13, the comparator 50 compares the integration output signal SPI from the integrator 49 and the integration output signal SNI from the integrator 51 and then, in Step S14, it determines which is larger. If the integration output signal SPI from the integrator 49 is larger, the memory address computationally determined by the correction data address computing section 17 is shifted by a predetermined amount in the forward direction in Step S15A. If, on the other hand, the integration output signal SPN from the integrator 51 is larger, the memory address computationally determined by the correction data address computing section 17 is shifted by the predetermined amount in the backward direction.

In short, it is safe to judge that the smaller one as determined by the comparison of the algorithm shown in FIG. 9 is close to the right address so that the outcome of the determination is supplied to the correction data address computing section 17 as correction error signal DER and the memory address corresponding to the corrected digital video signal DVX of each of the line periods of each frame period as computationally determined by the correction data address computing section 17 is shifted on the basis of the correction error signal DER so as to reduce the correction error.

Actually, the correction data address computing section 17 computationally determines the memory address by shifting an address amount that corresponds to about $\frac{1}{64}$ of a period of the flicker component on the basis of the correction error signal DER and forms a memory address signal DAL that indicates the computationally determined memory address. While the time necessary for convergence is reduced when the correction data address computing section 17 uses a large shift for computationally determining the memory address, the image then causes occurrence of a flicker because the phase of the flicker correction waveform is shifted to a large extent in each frame. Therefore, the amount by which the address is shifted is suppressed to make it smaller than the amount used by the correction error detection circuit 16. The influence of the discrepancy of the computed address that arises due to the error caused by fluctuations of the power supply frequency and the error caused by fluctuations of the actual camera frame rate can be suppressed by constantly moving the correction error detection circuit 16 during the camera shooting operation.

Then, as the flicker correction circuit 12 corrects the flicker on a frame by frame basis according to the sequence illustrated by the flowchart of FIG. 12, the information on the flicker correction of the n-th frame is compared with the image of the n+1-th frame and the outcome of the comparison is reflected to the flicker correction of the n+2-th frame.

In this way, the correction error of the flicker component of the digital video signal DV is reduced by executing an arithmetic process on the flicker correction signal DCU and the digital video signal DV of each frame period when producing a corrected digital video signal DVX for the frame period for which the flicker component is corrected. Thus, if the digital video signal DV is any of a plurality of video signals of different frame periods or the flicker component contained in the digital video signal DV is any of a plurality of flicker components having respective repetition periods that are different from each other, it is possible to obtain a corrected digital video signal DVX showing an effectively reduced flicker component so that the flicker component contained in any digital video signal DV is accurately and effectively reduced.

Thus, the flicker correction circuit 12 can acquire a corrected digital video signal DVX from which the flicker is removed by way of the above-described flicker correcting operation.

In the case of the frame flicker that is produced by global shutter system, the above-described correction data address computing section 17 is adapted so as not to compute the address of each line but to compute the address of each frame of image for the purpose of correcting the flame flicker.

In the instance of the flicker correction circuit 12 illustrated in FIG. 5, the flicker correction signal sending out section 13 uses the correction data memory 18 that stores correction data for reducing the flicker component contained in the digital video signal DV for each frame on a line period by line period basis for the plurality of line periods of the frame period in order to obtain a flicker correction signal DCU in the above description. However, the configuration of the flicker correction signal sending out section for sending out a flicker correction signal is by no means limited thereto. For example, it may alternatively be so arranged that the flicker correction signal sending out section generates a flicker correction signal each time it receives an arriving video signal that contains a flicker component. Similarly, in the instance of the flicker correction circuit 12 illustrated in FIG. 5, the flicker correcting operation for producing a corrected digital video signal DVX by reducing the flicker component contained in the digital video signal DV is conducted on a line period by line period basis for the plurality of line periods of each frame period. However, it is not necessary to conduct a flicker correcting operation on a video signal containing a flicker component on a line period by line period basis for the plurality of line periods of each frame period.

A flicker correction method and a flicker correction circuit according to the present invention can find applications in a broad scope of image pickup apparatus comprising an imaging signal generating section that contains a solid-state imaging element in the inside to produce a video signal representing an image of a subject according to the imaging output signal obtained from the imaging signal generating section for the purpose of accurately and effectively reducing the flicker component contained in the video signal. Thus, an image pickup apparatus according to the present invention can find applications in various fields as an image pickup apparatus that can effectively reduce the flicker component from the video signal that represents an image of a subject and obtained on the basis of the imaging output signal that is by turn obtained from the imaging signal generating section that contains a solid-state imaging element.

Figure 14:
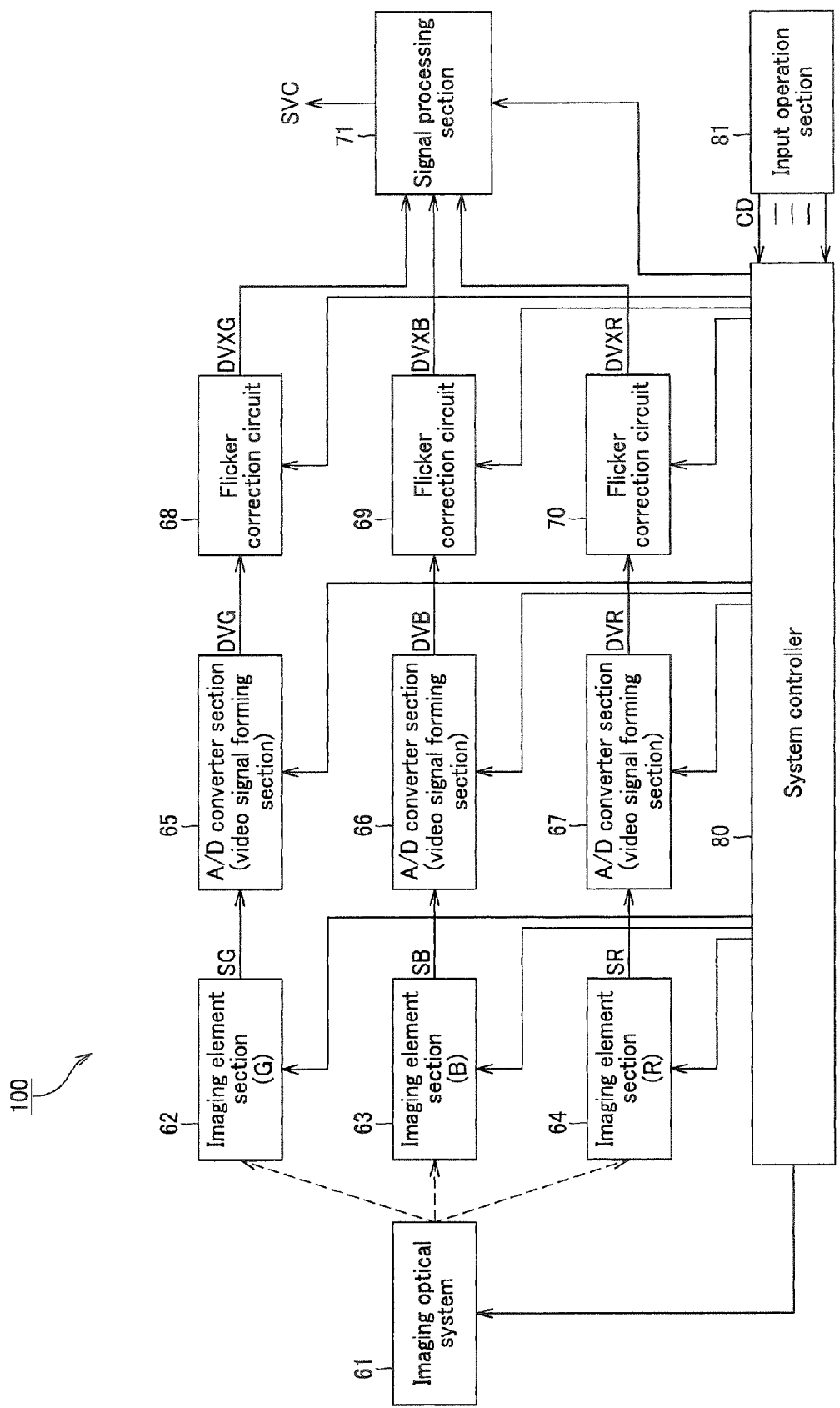
FIG. 14 is a schematic block diagram of an embodiment of image pickup apparatus realized by applying a flicker correction method and a flicker correction circuit according to the present invention.

A flicker correction method and a flicker correction circuit according to the present invention can be applied to an image pickup apparatus 100 having a configuration as shown in FIG. 14.

Referring to FIG. 14, the image pickup apparatus 100 comprises imaging element sections 62, 63, 64 for respectively picking up a green image, a blue image and a red image by means of imaging light coming from a subject by way of an imaging optical system 61, analog/digital (A/D) converter sections 65, 66, 67 for respectively digitizing the imaging signals SG, SB, SR of the color images obtained by the imaging element sections 62, 63, 64, flicker correction circuits 68, 69, 70 for respectively executing flicker correction processes on the imaging signals DVG, DVB, DVR digitized by the A/D converter sections 65, 66, 67, signal processing circuit 71 for the camera to which the imaging signals DVXG, DVXB, DVXR that are respectively corrected for the flicker by the flicker correction circuits 68, 69, 70 are supplied, a system controller 80 for controlling the above components and an input operation section 81 connected to the system controller 80.

The imaging optical system 61 typically contains a plurality of lenses, an aperture mechanism, a color decomposition prism and a focus adjusting mechanism among others and is provided so as to be directed to the subject. Light coming from the subject by way of the imaging optical system 61 is then led to the imaging element sections 62, 63, 64.

Each of the imaging element sections 62, 63, 64 is typically a CMOS image sensor having an imaging surface section where a large number of photoelectric conversion pixels are arranged to form light receiving sections, a charge transfer section from which the signal charge accumulated in each of the light receiving sections due to the photoelectric conversion effect thereof is sent out by way of a CMOS that performs switching operations and an output section for generating an imaging output signal according to the signal charge sent out from the charge transfer section.

The imaging element section 62 performs photoelectric conversion for green light (G) out of the light from the subject to send out a green light imaging output signal SG and the imaging element section 63 performs photoelectric conversion for blue light (B) out of the light from the subject to send out a blue light imaging output signal SB, while the imaging element section 64 performs photoelectric conversion for red light (R) out of the light from the subject to send out a red light imaging output signal SR. The green light imaging output signal SG obtained from the imaging element section 62 is supplied to the analog/digital (A/D) converter section 65 of the video signal forming section and subjected to various processes including gain control and A/D conversion. Thus, a digital video signal DVG is formed on the basis of the green light imaging output signal SG. Similarly, the blue light imaging output signal SB obtained from the imaging element section 63 is supplied to the analog/digital (A/D) converter section 66 of the video signal forming section and subjected to various processes including gain control and A/D conversion. Thus, a digital video signal DVB is formed on the basis of the blue light imaging output signal SB. Additionally, the red light imaging output signal SR obtained from the imaging element section 64 is supplied to the analog/digital (A/D) converter section 67 of the video signal forming section and subjected to various processes including gain control and A/D conversion. Thus, a digital video signal DVR is formed on the basis of the red light imaging output signal SR.

The digital video signal DVG obtained from the A/D converter section 65 is supplied to the flicker correction circuit 68 and the digital video signal DVB obtained from the A/D converter section 66 is supplied to the flicker correction circuit 69, while the digital video signal DVR obtained from the A/D converter section 67 is supplied to the flicker correction circuit 70. Each of the flicker correction circuits 68, 69, 70 typically has a configuration same as the flicker correction circuit 12 illustrated in FIG. 5.

Thus, each of the flicker correction circuits 68, 69, 70 comprises a flicker correction signal sending out section that sends out a flicker correction signal corresponding to the flicker component contained in digital video signal DVG, DVB or DVR for each frame period that is formed in response to the correction error signal of the frame period like the flicker correction signal sending out section 13 of FIG. 5, an arithmetic processing section that executes an arithmetic process on the digital video signal for the current frame period and the flicker correction signal sent out from the flicker correction signal sending out section to form a corrected digital video signal of the frame for which the flicker component is corrected like the arithmetic processing section 15 of FIG. 5 and a correction error detecting section that detects the correction error of the flicker component from the corrected digital video signal of the frame period immediately preceding the current frame period and the corrected digital video signal of the current frame period, obtains a correction error signal of the current frame period that corresponds to the detected correction error and supplies it to the flicker correction signal sending out section so that the flicker correction signal sending out section may reduce the correction error of the flicker correction signal according to the correction error signal like the correction error detecting section 16 of FIG. 5.

The flicker correction circuit 68 executes a flicker correction process of reducing the flicker component contained in the digital video signal DVG obtained from the A/D converter section 65 and obtains a corrected digital video signal DVXG having a reduced flicker component like the flicker correction circuit 12 of FIG. 5 that executes a flicker correction process of reducing the flicker component contained in the digital video signal DV and obtains a corrected digital video signal DVX having a reduced flicker component. Similarly, the flicker correction circuit 69 executes a flicker correction process of reducing the flicker component contained in the digital video signal DVB obtained from the A/D converter section 66 and obtains a corrected digital video signal DVXB having a reduced flicker component like the flicker correction circuit 12 of FIG. 5 that executes a flicker correction process of reducing the flicker component contained in the digital video signal DV and obtains a corrected digital video signal DVX having a reduced flicker component. The flicker correction circuit 70 executes a flicker correction process of reducing the flicker component contained in the digital video signal DVR obtained from the A/D converter section 67 and obtains a corrected digital video signal DVXR having a reduced flicker component like the flicker correction circuit 12 of FIG. 5 that executes a flicker correction process of reducing the flicker component contained in the digital video signal DV and obtains a corrected digital video signal DVX having a reduced flicker component.

A flicker information signal and a frame information signal that correspond respectively to the flicker information signal DFI and the frame information signal DFR supplied to the flicker correction circuit 12 of FIG. 5 are supplied to each of the flicker correction circuits 68, 69, 70 from system controller 80, which will be described in greater detail hereinafter.

The corrected digital video signals DVXG, DVXB, DVXR obtained respectively from the flicker correction circuits 68, 69, 70 are then supplied to the signal processing section 71. The signal processing section 71 forms color video signal SVC typically conforming to the NTSC (National Television System Committee) color television system based on the corrected digital video signals DVXG, DVXB, DVXR and sends it out as output video signal.

The above-described imaging optical system 61, the imaging element sections 62, 63, 64, the A/D converter sections 65, 66, 67, the flicker correction circuits 68, 69, 70 and the signal processing section 71 are controlled by the system controller 80 provided to control the overall operation of the apparatus. The system controller 80 is connected to an input operation section 81 and a command CD that corresponds to an operation at the input operation section 81 is supplied from the input operation section 81 to the system controller 80. Then, the system controller 80 controls the components of the apparatus according to the command CD from the input operation section 81. For instance, the above-described control operation of supplying a flicker information signal and a frame information signal from the system controller 80 to each of the flicker correction circuits 68, 69, 70 is performed according to the command CD from the input operation section 81.

For the operation of the image pickup apparatus 100 described above by referring to FIG. 14 of forming digital video signals DVG, DVB, DVR according to the green, blue and red imaging output signals SG, SB, SR respectively from the imaging element sections 62, 63, 64, each having an imaging surface section where a large number of photoelectric conversion pixels are arranged, and executing flicker correction processes of reducing the flicker components on the digital video signals DVG, DVB, DVR, the above-described flicker correction circuits 68, 69, 70 are responsible for the flicker correction processes to be executed on the digital video signals DVG, DVB, DVR.

When the image pickup apparatus 100 executes arithmetic processes on the flicker correction signals and the digital video signals DVG, DVB, DVR for each frame period to produce corrected digital video signals DVXG, DVXB, DVXR that are obtained by correcting the flicker components for each frame period, the flicker correction signals are used to reduce the correction errors on the flicker components. Therefore, it is possible to obtain corrected digital video signals DVXG, DVXB, DVXR having respective flicker components that are effectively reduced and hence the flicker components contained in the digital video signals DVG, DVB, DVR are accurately and effectively reduced when each of the digital video signals DVG, DVB, DVR is any of various video signals having different respective frame periods or some other specific periods or when the flicker component contained in each of the digital video signals DVG, DVB, DVR is any of various flicker components having different respective repetition periods.

The present invention is by no means limited to the above-described embodiments, which may be modified in various different ways without departing from the spirit and scope of the invention.

The invention claimed is:

1. A flicker correction circuit comprising:
a flicker correction signal sending out circuit section that sends out a flicker correction signal corresponding to the flicker component contained in a video signal of each of specific periods, the video signal being formed as a succession of specific periods and containing a flicker component, in response to a correction error signal for each of the specific periods;
an arithmetic processing circuit section that executes an arithmetic process on the flicker correction signal sent out from the flicker correction signal sending out circuit section and the video signal of each of the specific periods to form a corrected video signal of the specific period corrected for the flicker component; and
a correction error detecting circuit section that detects the correction error on the flicker component from the corrected video signal of the specific period immediately preceding each of the specific periods and the corrected video signal of the each of the specific periods, acquires the correction error signal of each of the specific periods as a signal corresponding to the detected correction error, supplies the correction error signal to the flicker correction signal sending out circuit section, and acquires the flicker correction signal as a signal for reducing the correction error according to the correction error signal.

2. The circuit according to claim 1, wherein the correction error detecting circuit section includes means for predicting and acquiring the flicker component contained in the video signal of the specific period immediately succeeding each of the specific periods, means for adding the predicted and acquired flicker component to the corrected video signal acquired for each of the specific periods and forming a corrected video signal with the acquired flicker component of a specific period added thereto, means for storing the corrected video signal with the flicker component added thereto, and means for detecting the correction error of the flicker component from the corrected video signal of the specific period immediately preceding each of the specific periods with the acquired and stored flicker component added thereto and the corrected video signal of the each of the specific periods, acquiring the corrected error signal of each of the specific periods corresponding to the detected correction error and supplying the correction error signal to the flicker correction signal sending out circuit section.

3. The circuit according to claim 2, wherein the flicker correction signal sending out circuit section includes a correction data memory that stores a plurality of flicker correction data, a correction data address computing circuit section that acquires an address of the correction data memory as computationally determined according to the frequency of the flicker component and the rate of the video signal in the specific period and modified according to the correction error signal of each of the specific periods and reads out the flicker correction data from the correction data memory by means of the acquired address, and a flicker correction signal forming circuit section that forms a flicker correction signal according to the flicker correction data read out from the correction data memory.

4. The circuit according to claim 1, wherein the flicker correction signal sending out circuit section sends out the flicker correction signal as obtained by modifying the correction signal defined according to the phase of the flicker component in each of the specific periods according to the correction error signal of each of the specific periods.

5. The circuit according to claim 1, wherein the specific period is a frame period of the video signal.

6. The circuit according to claim 1, wherein the correction error detecting circuit section forms flicker signals of two kinds representing flicker components of different phases and predicting the flicker of the video signal of the next frame by computationally determining the memory address for reading out the flicker data that corresponds to each of the line periods of the next frame from a flicker data memory storing flicker data, converting the computationally determined memory address into an advanced/converted memory address obtained by forwardly shifting the memory address by a predetermined address amount and a retreated/converted memory address obtained by backwardly shifting the memory address by a predetermined address amount and reading out the flicker signal of the advanced/converted memory address and the flicker data of the retreated/converted memory address from the flicker data memory, and compares each of the flicker video signals of two kinds formed by adding the flicker signal to the corrected video signal corrected for the flicker and the input video signal of the next frame to select the flicker data showing the flicker component of the flicker video signal showing the smaller difference as correction error signal.

7. The circuit according to claim 6, wherein the flicker data memory of the correction error detecting circuit section holds the flicker data of one n-th of a period and the correction data memory of the flicker correction signal sending out circuit section holds the flicker correction data of one n-th of a period so that the correction error is sequentially reduced by shifting the address in the correction data memory for reading out flicker correction data by a predetermined address amount smaller than the predetermined address amount for shifting the memory address to detect the correction error.

8. An image pickup apparatus comprising:
an imaging element section that has an imaging surface section formed by arranging a plurality of photoelectric conversion pixels;
a video signal forming section that forms a video signal according to the imaging output signal from the imaging element section;
a flicker correction circuit including a flicker correction signal sending out section that sends out a flicker correction signal corresponding to the flicker component contained in the video signal of each of specific periods acquired from the video signal forming section, in response to a correction error signal for each of the specific periods, an arithmetic processing section that executes an arithmetic process on the flicker correction signal sent out from the flicker correction signal sending out section and the video signal of each of the specific periods to form a corrected video signal of the specific period corrected for the flicker component, and a correction error detecting section that detects the correction error on the flicker component from the corrected video signal of the specific period immediately preceding each of the specific periods and the corrected video signal of the each of the specific periods, acquires the correction error signal of each of the specific periods as a signal corresponding to the detected correction error, supplies the correction error signal to the flicker correction signal sending out section, and acquires the flicker correction signal as a signal for reducing the correction error according to the correction error signal; and
a signal processing section that executes a signal process on the corrected video signal acquired from the flicker correction circuit to form an output video signal.

9. The apparatus according to claim 8, wherein a plurality of sets of an imaging element section, a video signal forming section and a flicker correction circuit as defined above are provided and the corrected video signal obtained from the flicker correction circuit of each of the plurality of sets is supplied to the signal processing section.

10. The apparatus according to claim 8, wherein three sets of an imaging element section, a video signal forming section and a flicker correction circuit as defined above are provided to respectively form a green primary color video signal, a blue primary color video signal and a red primary color video signal and a corrected green primary color video signal, a corrected blue primary color video signal and a corrected red primary color video signal are obtained respectively from the three flicker correction circuits of the three sets and supplied to the signal processing section.

11. The apparatus according to claim 8, wherein the flicker correction signal sending out section sends out the flicker correction signal as obtained by modifying the correction signal defined according to the phase of the flicker component in each of the specific periods according to the correction error signal of each of the specific periods.

12. The apparatus according to claim 8, wherein the flicker correction signal sending out section includes a correction data memory that stores a plurality of flicker correction data, a correction data address computing section that acquires an address of the correction data memory as computationally determined according to the frequency of the flicker component and the rate of the video signal in the specific period and modified according to the correction error signal of each of the specific periods and reads out the flicker correction data from the correction data memory by means of the acquired address, and a flicker correction signal forming section that forms a flicker correction signal according to the flicker correction data read out from the correction data memory.

13. The apparatus according to claim 8, wherein the specific period is a frame period of the video signal.

14. The apparatus according to claim 8, wherein the correction error detecting section forms flicker signals of two kinds representing flicker components of different phases and predicting the flicker of the video signal of the next frame by computationally determining the memory address for reading out the flicker data that corresponds to each of the line periods of the next frame form a flicker data memory storing flicker data, converting the computationally determined memory address into an advanced/converted memory address obtained by forwardly shifting the memory address by a predetermined address amount and a retreated/converted memory address obtained by backwardly shifting the memory address by a predetermined address amount and reading out the flicker signal of the advanced/converted memory address and the flicker data of the retreated/converted memory address from the flicker data memory, and compares each of the flicker video signals of two kinds formed by adding the flicker signal to the corrected video signal corrected for the flicker and the input video signal of the next frame to select the flicker data showing the flicker component of the flicker video signal showing the smaller difference as correction error signal.

15. The apparatus according to claim 14, wherein the flicker data memory of the correction error detecting section holds the flicker correction data of one n-th of a period and the correction data memory of the flicker correction signal sending out section holds the flicker correction data of one n-th of a period so that the correction error is sequentially reduced by shifting the address in the correction data memory for reading out flicker correction data by a predetermined address amount smaller than the predetermined address amount for shifting the memory address to detect the correction error.

* * * * *